US012706303B1

(12) United States Patent
Li et al.

(10) Patent No.: US 12,706,303 B1

(45) Date of Patent: Aug. 11, 2026

(54) LITHIUM-ION SECONDARY BATTERY, BATTERY APPARATUS, ELECTRICAL APPARATUS, PREPARATION METHOD FOR POSITIVE ELECTRODE ACTIVE MATERIAL, AND PREPARATION METHOD FOR POSITIVE ELECTRODE PLATE

(71) Applicant: CONTEMPORARY AMPEREX TECHNOLOGY CO., LIMITED, Ningde (CN)

(72) Inventors: Xiaojing Li, Ningde (CN); Sheng Chen, Ningde (CN); Xiaoyang Jia, Ningde (CN); Yingxi Lin, Ningde (CN); Hongyu Liu, Ningde (CN); Changfeng Bie, Ningde (CN); Yuli Liang, Ningde (CN); Huan Ni, Ningde (CN); Na Liu, Ningde (CN); Xinde Ye, Ningde (CN); Jia Li, Ningde (CN); Xiaofeng Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/342,687

(22) Filed: Sep. 29, 2025

Related U.S. Application Data

(63) Continuation of application No. PCT/CN2025/085921, filed on Mar. 28, 2025.

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0404* (2013.01); *H01M 4/131* (2013.01);
(Continued)

(58) Field of Classification Search
CPC .... H01M 4/366; H01M 4/0404; H01M 4/131; H01M 4/1391; H01M 4/5825;
(Continued)

(56) References Cited

U.S. PATENT DOCUMENTS

2016/0240856 A1* 8/2016 Paulsen ................. H01M 4/136
2024/0079635 A1* 3/2024 Zhang ................. H01M 4/0459
(Continued)

FOREIGN PATENT DOCUMENTS

CN 101207190 A 6/2008
CN 111554903 A 8/2020
(Continued)

OTHER PUBLICATIONS

CN-115312763-A—Machine Translation (Year: 2022).*
(Continued)

*Primary Examiner* — Brian R Ohara
*Assistant Examiner* — Patrick Marshall Greene
(74) *Attorney, Agent, or Firm* — K&L Gates LLP

(57) ABSTRACT

The present disclosure relates to a lithium-ion secondary battery, a battery apparatus, an electrical apparatus, and preparation methods for a positive electrode active material and a positive electrode plate. The battery includes a positive electrode plate, a negative electrode plate, and an electrolyte. The positive electrode plate comprises a current collector and a film layer disposed on at least one side of the collector. The film layer comprises a positive electrode active material including lithium-containing transition metal phosphate particles, at least part of the surfaces of which are coated with a carbon material. In a cross-section along the electrode plate thickness direction, the DA90 of the particles ranges from 1400 nm to 2100 nm, and the particle size concentration ratio (DA90–DA10)/DA50 ranges from 1.855 to 2.375, wherein DA90, DA50, and DA10 respectively denote the
(Continued)

particle sizes corresponding to 90%, 50%, and 10% of the area cumulative distribution.

20 Claims, 3 Drawing Sheets

(51) Int. Cl.
*H01M 4/04* (2006.01)
*H01M 4/131* (2010.01)
*H01M 4/1391* (2010.01)
*H01M 4/58* (2010.01)
*H01M 4/587* (2010.01)
*H01M 10/0525* (2010.01)

(52) U.S. Cl.
CPC ....... *H01M 4/1391* (2013.01); *H01M 4/5825* (2013.01); *H01M 4/587* (2013.01); *H01M 10/0525* (2013.01); *H01M 2004/021* (2013.01); *H01M 2004/028* (2013.01)

(58) Field of Classification Search
CPC ............. H01M 4/587; H01M 10/0525; H01M 2004/021; H01M 2004/028
See application file for complete search history.

(56) References Cited

U.S. PATENT DOCUMENTS

2024/0274796 A1* 8/2024 Zhou ................. H01M 10/0567
2025/0219095 A1* 7/2025 He ...................... H01M 50/109
2025/0329731 A1* 10/2025 Choi .................. H01M 4/5825

FOREIGN PATENT DOCUMENTS

CN 114256443 A 3/2022
CN 115312763 A 11/2022
CN 115513515 A 12/2022
CN 115954452 A 4/2023
CN 116646476 A 8/2023
CN 117509595 A 2/2024
CN 118281166 A * 7/2024 .......... H01M 4/5825
CN 118373397 A 7/2024
CN 118435395 A 8/2024
CN 118538912 A 8/2024
CN 118867139 A * 10/2024 ........ H01M 10/0525
CN 119230825 A * 12/2024 ........... C01B 25/455
CN 119340353 A 1/2025
CN 119542506 A 2/2025
CN 119695097 A 3/2025
JP 2019046560 A 3/2019
KR 20230148175 A 10/2023
KR 20240140979 A 9/2024
WO 2024234544 A1 11/2024
WO 2025015857 A1 1/2025

OTHER PUBLICATIONS

CN118281166A—Machine Translation (Year: 2024).*
CN119230825A—Machine Translation (Year: 2024).*
CN118867139A.—Machine Translation (Year: 2024).*
The First Office Action received in the counterpart CN Application No. 202510550890.1, dated Jun. 20, 2025, 21 pages with English translation.
The Grant Notice received in the counterpart CN Application No. 202510550890.1, dated Jul. 14, 2025, 9 pages with English translation.
Office Action (with English Machine Translation), mailed Dec. 10, 2025, for corresponding Korean Patent Application Serial No. 10-2025-7031265.
International Search Report (with English Machine Translation), mailed Dec. 2, 2025, for International Patent Application Serial No. PCT/CN2025/085921.

* cited by examiner

LITHIUM-ION SECONDARY BATTERY, BATTERY APPARATUS, ELECTRICAL APPARATUS, PREPARATION METHOD FOR POSITIVE ELECTRODE ACTIVE MATERIAL, AND PREPARATION METHOD FOR POSITIVE ELECTRODE PLATE

TECHNICAL FIELD

The present application relates to the field of lithium-ion secondary battery technologies, and in particular, to a lithium-ion secondary battery, a battery apparatus, an electrical apparatus, a preparation method for a positive electrode active material, and a preparation method for a positive electrode plate.

BACKGROUND

In recent years, secondary batteries have been widely used in energy storage power systems such as hydraulic, thermal, wind, and solar power stations, as well as in various fields such as power tools, electric bicycles, electric motorcycles, electric vehicles, military equipment, aerospace, etc.

A positive electrode active material is an important constituent part of a secondary battery, and a lithium-containing transition metal phosphate material has features of a stable structure, good safety, and a long cycle life, and has a broad development prospect. With the increase in requirements for the energy density and the dynamics of the secondary battery of the lithium-containing transition metal phosphate system in the market, it is difficult to improve all of the foregoing performance together in the existing technology. This becomes a technical problem that needs to be resolved urgently in the art.

SUMMARY

In view of the foregoing problem, the present application provides a lithium-ion secondary battery. In the lithium-ion secondary battery, a particle size concentration ratio and particle sizes of large particles in a positive electrode film layer are regulated, and close packing is formed through proper grading, so that the lithium-ion diffusion and conduction paths are optimized while having a high energy density, and dynamic performance of the secondary battery is also considered.

A first aspect of the present application provides a lithium-ion secondary battery, including a positive electrode plate, a negative electrode plate, and an electrolyte, where the positive electrode plate includes a positive electrode current collector and a positive electrode film layer arranged on at least one side of the positive electrode current collector; the positive electrode film layer includes a positive electrode active material, and the positive electrode active material includes lithium-containing transition metal phosphate particles, at least some surfaces of which are provided with a carbon coated material; and in a cross section of the positive electrode film layer in an electrode plate thickness direction, $D_{A90}$ of the particles ranges from 1400 nm to 2100 nm, and a particle size concentration ratio $(D_{A90}-D_{A10})/D_{A50}$ ranges from 1.855 to 2.375, where $D_{A90}$, $D_{A50}$, and $D_{A10}$ refer to corresponding particle sizes of particles when area cumulative distributions of the particles reach 90%, 50%, and 10% in an area cumulative distribution curve of the particles.

In the existing technology, the particle size concentration ratio of the particles in the positive electrode film layer is usually increased to improve a compacted density of the electrode plate and increase an energy density of a battery. However, research shows that different from cognition in the existing technology, in the cross section of the positive electrode film layer along the electrode plate thickness direction, an excessively large particle size concentration ratio has a limited effect on improving compaction of the electrode plate, and it is difficult to further improve compaction of the electrode plate by adjusting the particle size concentration ratio. The particle size concentration ratio of the particles is less than 1.855, representing that the particle size distribution difference is relatively small, the grading effect is insignificant, and there is a lack of relatively small particles that fill gaps between relatively large particles. After the concentration ratio exceeds 2.375, it means that the size difference between the active material particles is significant, so that optimal close packing cannot be implemented on the positive electrode film layer, and it is difficult to further improve the compacted density of the electrode plate. In the existing technology, a common manner of adjusting the particle size concentration ratio is increasing the sizes or proportion of large particles. However, the applicant further finds, through research, that when the $D_{A90}$ of the particles in the positive electrode film layer is greater than 2100 nm, the large particles in the positive electrode film layer significantly worsens the dynamic performance of the battery.

In an implementation of the present application, by controlling the particle size concentration ratio $(D_{A90}-D_{A10})/D_{A50}$ of the particles in the positive electrode film layer to range from 1.855 to 2.375, and $D_{A90}$ to range from 1400 nm to 2100 nm, a high dynamic performance of the battery is maintained while a particle packing condition in the positive electrode film layer is improved, a compacted density of the electrode plate is increased, and an energy density of the battery is improved, thereby considering both the dynamic performance and the energy density of the battery.

In any implementation, $D_{A90}$ of the particles in the cross section of the positive electrode film layer in the electrode plate thickness direction ranges from 1400 nm to 2000 nm.

$D_{A90}$ of the particle sizes of the particles in the cross section of the positive electrode film layer in the electrode plate thickness direction falling within the foregoing range can reduce internal resistance of the battery, and further suppress negative impact of excessively large particles on the dynamic performance.

In any implementation, $D_{A50}$ of the particles in the cross section of the positive electrode film layer in the electrode plate thickness direction ranges from 600 nm to 900 nm, and optionally ranges from 650 nm to 750 nm.

$D_{A50}$ of the particle sizes of the particles falling within the foregoing range is beneficial to, on one hand, maintaining a support function of the particles, so that the rolling pressure is transmitted evenly among the particles of the electrode plate, and the electrode plate withstands a higher rolling pressure; and indicates, on the other hand, that the overall particle sizes of the particles inside the positive electrode film layer is relatively small, so that the dynamic performance is maintained at a relatively high level, and the energy density is improved in consideration of the dynamics of the battery.

In any implementation, $D_{A10}$ of the particles in the cross section of the positive electrode film layer in the electrode plate thickness direction ranges from 100 nm to 300 nm, and optionally ranges from 120 nm to 250 nm.

$D_{A10}$ of the particles in the cross section of the positive electrode film layer in the electrode plate thickness direction falling within the foregoing range indicates, on one hand, that the film layer has small particles to form grading to fill gaps between the particles, and does not cause agglomeration because the particles are excessively small; and indicates, on the other hand, that the proportion of particles in small particle sizes is limited, which can improve the compaction of the electrode plate and reduce the side reaction between the small particles and the electrolyte, and also consider the cycle performance of the battery.

In any implementation, in a graphitization degree C value cumulative distribution curve of the positive electrode film layer that is obtained in a laser micro-confocal Raman spectrometer surface scanning mode, a graphitization degree median $C_{50}$ ranges from 0.98 to 1.20, and optionally ranges from 1.02 to 1.10; and a graphitization degree C value is $I_G/I_D$, where $I_G$ represents an intensity of a G peak at $1580\pm100\ cm^{-1}$ of a Raman spectrum, and $I_D$ represents an intensity of a D peak at $1350\pm100\ cm^{-1}$ of the Raman spectrum.

A higher graphitization degree of carbon on the surface of the positive electrode active material indicates a higher proportion of carbon of the graphitic structure in the positive electrode film layer, and the particles are more likely to slip in a rolling process with the help of the carbon structure having a high graphitization degree in the coated material. Based on proper grading of the particles in the electrode plate, the compacted density of the electrode plate can still be further improved even with a low rolling pressure. The high graphitization degree of the surface coated carbon layer of the positive electrode active material is beneficial to electron transport, thereby considering both the energy density and the dynamics.

In any implementation, in the sphericity area cumulative distribution curve of the particles that are obtained from the cross section of the positive electrode film layer in the electrode plate thickness direction, the sphericity median $L_{A50}$ ranges from 0.70 to 0.85, and optionally ranges from 0.70 to 0.76.

Particles whose sphericity median $L_{A50}$ falls within the foregoing range are approximately spherical. This helps the particles maintain good slidability during packing, easily fills gaps between the particles, and can further improve the compacted density of the electrode plate and improve the energy density of the battery.

In any implementation, in a roughness area cumulative distribution curve of the particles that are obtained from the cross section of the positive electrode film layer in the electrode plate thickness direction, a roughness median $R_{A50}$ ranges from 0.92 to 0.96.

The surfaces of the particles having the roughness median $R_{A50}$ within the foregoing range are relatively smooth, the friction between the particles is relatively small, and slippage easily occurs under an external force, thereby further improving a compacted density of the electrode plate and increasing an energy density of the battery.

In any implementation, in the roughness area cumulative distribution curve of the particles that are obtained from the cross section of the positive electrode film layer in the electrode plate thickness direction, a roughness concentration ratio $(R_{A90}-R_{A10})/R_{A50}$ ranges from 0.05 to 0.10. A very small value of the roughness concentration ratio indicates high whole roughness consistency of the particles, facilitating relative sliding between the particles, and more easily forming a high-density packing during rolling, increasing a compacted density of the electrode plate and an energy density of the battery.

In any implementation, an iron dissolution rate of the positive electrode film layer ranges from 400 ppm to 1800 ppm.

The iron dissolution rate of the positive electrode film layer is mainly derived from the positive electrode active material with the lithium-containing transition metal phosphate in the positive electrode film layer. The iron dissolution rate of the positive electrode film layer is within the foregoing range, representing that the positive electrode active material has a relatively complete and dense carbon coated material, which can improve the electric contact between the positive electrode active materials, improve the conductivity of the positive electrode active materials, reduce the polarization of the positive electrode active materials, and further optimize the dynamic performance of the lithium-ion secondary battery. In addition, the structure of the carbon coated material with high integrity enables the particles to be easily stressed to slip in a rolling process, and can improve both a compacted density of the electrode plate and an energy density of the battery.

In any implementation, a mass content of a carbon element based on a total mass of the positive electrode active material ranges from 0.8% to 1.8%, and optionally ranges from 0.9% to 1.5%. Compared with a positive electrode active material with a lithium-containing transition metal phosphate in the existing technology, the positive electrode active material has a lower content of carbon coating, so that the loading amount of the lithium-containing transition metal phosphate in the positive electrode plate can be further increased, and the energy density of the lithium-ion secondary battery can be improved.

In any implementation, a lithium-iron antisite defect concentration of the positive electrode active material ranges from 0.001% to 1.5%, and optionally ranges from 0.01% to 1.0%. The positive electrode active material has a low lithium-iron antisite defect, thereby facilitating uniform transport of lithium ions in a solid phase, and further improving the dynamic performance of the lithium-ion secondary battery.

In any implementation, the lithium-containing transition metal phosphate includes a component having the following general formula: $Li_mFe_xP_yO_jQ_q$ where Q includes one or more of Al, Na, K, Mg, Cu, Mn, Cr, Zn, Pb, Ca, Co, Ni, Sr, Nb, V, Ti, B, S, Si, N, F, Cl, and Br, $0.8\leq m\leq1.15$, $0.9\leq x\leq1$, $0.95\leq y\leq1$, $3.5\leq j\leq4$, and $0<q\leq0.1$.

Selection of a proper modifying element Q can improve the lattice change rate of the positive electrode active material in a process of lithium intercalation/deintercalation, reduce the oxygen activity on the surfaces of the particles, and improve the structural stability of the material, thereby improving the gram capacity development level of the material in a cycle process, and further improving the cycle stability of the lithium-ion secondary battery.

In any implementation, the positive electrode active material includes one or more of lithium iron phosphate, a doped and modified material thereof, and a coated and modified material thereof.

In any implementation, the positive electrode active material includes a titanium element, and a mass content of the titanium element based on the total mass of the positive electrode active material ranges from 4000 ppm to 8000 ppm. A high addition amount of the titanium element does not form a harmful impurity phase that negatively affects the energy density and the dynamic performance of the battery. Although the reason is unclear, it is presumed that the titanium element may form a fast ion conductor together with a phosphate group and another element (for example, a lithium element), to improve the dynamic performance of the battery.

In any implementation, a powder tapped density of the positive electrode active material ranges from 1.00 g/cm$^3$ to 1.70 g/cm$^3$, and optionally ranges from 1.20 g/cm$^3$ to 1.50 g/cm$^3$. The positive electrode active material particles not only have a relatively wide particle size distribution, but also have particle sizes within a reasonable interval, forming an effective grading. Small particles can fill gaps between the particles, and therefore have a relatively high tapped density.

In any implementation, a powder compacted density of the positive electrode active material under a pressure of 3T ranges from 2.55 g/cm$^3$ to 2.70 g/cm$^3$, and optionally ranges from 2.58 g/cm$^3$ to 2.68 g/cm$^3$. The positive electrode active material particles form effective grading, so that the positive electrode active material can construct, under an external force, a packed structure with extremely small particle gaps, and can achieve a higher compacted density, thereby providing a material basis for improving a compacted density of the electrode plate and preparing a lithium-ion secondary battery with a high energy density.

In any implementation, a powder resistivity of the positive electrode active material under a pressure of 8 MPa ranges from 0.5 Ω·cm to 60.0 Ω·cm, and optionally ranges from 2.0 Ω·cm to 40.0 Ω·cm.

The positive electrode active material coats the surface with the carbon material, and fast conduction of electrons between particles is easily implemented through an sp$^2$ structure of the carbon on the surface, so that the positive electrode active material has a low powder resistivity, which helps to improve a solid-phase transport rate of the electrons and improve the dynamic performance of the battery.

In any implementation, a discharge gram capacity of the positive electrode active material at a room temperature at a discharge rate of 1 C ranges from 135 mAh/g to 150 mAh/g. The positive electrode active material has a high discharge gram capacity at a rate of 1 C, indicating that the positive electrode active material has good charging and discharging capabilities, which helps improve the dynamic performance of the battery.

In any implementation, a ratio of a discharge capacity of the positive electrode active material discharged to 3.2 V is $\eta \geq 85\%$, where $\eta$ is defined as follows: a button battery including the positive electrode active material is charged and discharged twice at a constant current with a rate of 0.1 C in a voltage range of 2.0 V to 3.75 V at the room temperature, and then is charged and discharged once at a constant current with a rate of 1 C; and in a charge and discharge test at the rate of 1 C, a capacity value at which a discharge voltage is 3.2 V is extracted and recorded as $C_1$, a capacity value at which a discharge voltage is 2.0 V is extracted and recorded as $C_2$, and $\eta = C_1/C_2$, where a charge process includes constant-voltage charge with a constant voltage of 3.75 V and a constant-voltage cut-off current of 50 μA.

A high ratio of the discharge capacity of the positive electrode active material used in the lithium-ion secondary battery and discharged to 3.2 V means that the positive electrode active material has good dynamic performance. In addition, a high value of $\eta$ indicates that the lithium-ion secondary battery including the positive electrode active material still has a high voltage when the lithium-ion secondary battery is discharged to a low state of charge (SOC), which is beneficial to maintaining good power performance.

In any implementation, a mass content of a conductive agent based on a total mass of the positive electrode film layer ranges from 0.01% to 1.5%. The particles in the positive electrode film layer are closely packed. Therefore, the positive electrode active material particles have the surface coated with the carbon layer with a high graphitization degree and are in sufficient contact with each other, to have good electronic conductivity, which can reduce use of a conductive agent in the positive electrode film layer, thereby helping to further increase a loading amount of the positive electrode active material and improve the energy density of the lithium-ion secondary battery.

In any implementation, the positive electrode film layer further includes a binder, and based on the total mass of the positive electrode film layer, a mass content of the positive electrode active material ranges from 94.0% to 99.4%, and optionally ranges from 96.5% to 99.4%; and a mass content of the binder ranges from 0.5% to 3.0%.

The mass content of the positive electrode active material and the mass content of the binder are within the foregoing ranges, so that the loading amount of the active material in the positive electrode film layer per unit volume can be effectively increased, and a good internal bonding force can be maintained, thereby reducing occurrence probabilities of the problems of powder falling, expansion, and cracking, and considering safety performance while improving the energy density of the secondary battery.

In any implementation, a single-sided surface density of the positive electrode film layer ranges from 300 mg/1540 mm$^2$ to 450 mg/1540 mm$^2$. The positive electrode film layer having the surface density within the foregoing range can help improve the energy density of the lithium-ion secondary battery.

In any implementation, in a fully discharged state of the lithium-ion secondary battery, a compacted density of the positive electrode film layer ranges from 2.52 g/cm$^3$ to 2.78 g/cm$^3$.

In any implementation, in a fully discharged state of the lithium-ion secondary battery, a compacted density of the positive electrode film layer ranges from 2.55 g/cm$^3$ to 2.75 g/cm$^3$.

The compacted density of the positive electrode film layer being within the foregoing range helps improve the energy density of the lithium-ion secondary battery.

In any implementation, the positive electrode film layer satisfies at least one of the following conditions: (1) in a fully discharged state of the lithium-ion secondary battery, the compacted density of the positive electrode film layer ranges from 2.52 g/cm$^3$ to 2.78 g/cm$^3$, and in the cross section of the positive electrode film layer in the electrode plate thickness direction, a porosity of the positive electrode film layer ranges from 10% to 22%; and (2) in a fully discharged state of the lithium-ion secondary battery, the compacted density of the positive electrode film layer ranges from 2.55 g/cm$^3$ to 2.75 g/cm$^3$, and in the cross section of the positive electrode film layer in the electrode plate thickness direction, a porosity of the positive electrode film layer ranges from 10% to 20%.

A lower porosity in the cross section of the positive electrode film layer indicates, on one hand, better grading of large, medium-sized, and small particles in the positive electrode film layer and a higher compacted density. On the other hand, after same grading and rolling pressure, if the porosity is low, it indicates that the particles easily slip relative to each other, thereby reducing risks of overpressure and stress concentration in the film layer, further reducing a probability of releasing the positive electrode film in a long-cycle process, and facilitating improving long-cycle performance of the battery.

In any implementation, the positive electrode plate includes an undercoating, and the undercoating is arranged between the positive electrode film layer and the current collector; and the undercoating satisfies at least one of the following conditions: (1) the undercoating includes carbon-based particles, and a distribution density of the carbon-based particles having particle sizes greater than 100 nm in the undercoating is ≤10 pcs/10 μm; (2) a compacted density of the positive electrode plate in the fully discharged state is greater than or equal to 2.4 g/$cm^3$, and a single-sided thickness of the undercoating ranges from 1 μm to 4 μm; and (3) a compacted density of the positive electrode plate in the fully discharged state is greater than or equal to 2.5 g/$cm^3$, and a single-sided thickness of the undercoating ranges from 2 μm to 4 μm.

The undercoating helps to improve the electric conductivity and the bonding force between the positive electrode film layer and the current collector, reduce the release of the positive electrode film layer from the current collector during a cycle process, and improve the dynamic performance of the battery.

With an increase in the compacted density of the electrode plate, a pressing effect of the large-particle lithium-containing phosphate material (for example, having a particle size greater than 1 μm) in the positive electrode film layer on the undercoating is more prominent. Therefore, stress concentration is prone to occur at sites of the large particles, and even the large particles pass through the undercoating to damage the current collector. Increasing the thickness of the undercoating helps to alleviate a stress concentration phenomenon in the electrode plate, and further increases the extreme compacted density of the electrode plate.

A second aspect of the present application provides a battery apparatus, including the lithium-ion secondary battery according to the first aspect of the present application.

A third aspect of the present application provides an electrical apparatus, including at least one of the lithium-ion secondary battery according to the first aspect of the present application and the battery apparatus according to the second aspect of the present application.

A fourth aspect of the present application provides a preparation method for a positive electrode active material. The preparation method includes: obtaining a mixed raw material including a carbon source, a lithium source, an iron source, and a phosphorus source; adding a solvent and performing grinding to obtain a mixed slurry; drying the mixed slurry to obtain a precursor powder; and sintering the precursor powder to obtain a positive electrode active material, where the sintering the precursor powder to obtain a positive electrode active material at least two times of sintering: performing a first time of sintering to obtain a first sintered product, mixing the first sintered product and the carbon source to obtain an intermediate raw material, dividing the intermediate raw material into two groups, separately performing grinding on the two groups to obtain a first group of ground products and a second group of ground products, and mixing the first group of ground products with the second group of ground products to obtain a mixed intermediate product; and performing a second time of sintering on the mixed intermediate product, to obtain a positive electrode active material, where $D_{V50}$ of the first group of ground products ranges from 0.8 μm to 1.2 μm; and $D_{V50}$ of the second group of ground products ranges from 0.3 μm to 0.5 μm.

By adjusting the mass ratio of the first group of ground products to the second group of ground products, positive electrode active materials of different grading ratios can be obtained, so that an area ratio of particles of particle sizes can be finely adjusted to obtain a required packing structure.

The second time of sintering process can effectively shorten a sintering time at a high-temperature interval, thereby reducing a risk and a probability that extremely large particles appear during high-temperature sintering. Activity of the particles can be controlled by adjusting the particle sizes of the two groups of grinding during the second time of sintering, so that the positive electrode active material also has large particles with a particular area percentage, to enable the battery cell to have good dynamic performance while improving the compacted density of the electrode plate and improving the energy density of the battery cell.

A fifth aspect of the present application provides a preparation method for a positive electrode plate. The preparation method including: sequentially adding a binder, a conductive agent, and the positive electrode active material that is prepared in the preparation method according to the fourth aspect of the present application, dry mixing, adding a solvent, stirring, and adjusting a viscosity, to obtain a delivery slurry; and transfer-coating at least one side of a current collector with the delivery slurry, drying, and hot pressing, to obtain a positive electrode film layer.

In any implementation, the drying is at a temperature ranging from 95° C. to 105° C. and a speed ranging from 2.0 m/min to 2.3 m/min.

In any implementation, the hot pressing includes at least three times of hot rolling, hot rolling pressures are sequentially increased, and the hot rolling pressures sequentially range from 20 metric tons to 50 metric tons, 50 metric tons to 70 metric tons, and 70 metric tons to 90 metric tons; a hot rolling temperature ranges from 40° C. to 80° C.; and before entering hot rolling for a first time for compaction, the electrode plate is heated, and a heating temperature ranges from 40° C. to 50° C.

The positive electrode active material that is prepared by using the foregoing hot pressing process in combination with the preparation method of the fourth aspect is beneficial to further reducing the porosity of the cross section of the positive electrode film layer, increasing the extreme compacted density of the electrode plate, and improving the energy density of the battery.

The above description only refers to an overview of the technical solutions of the present application. In order to understand the technical means of the present application more clearly such that it can be implemented according to the content of the specification, and to make the above-mentioned and other purposes, features, and advantages of the present application more apparent, specific examples of the present application are listed below.

DESCRIPTION OF REFERENCE NUMERALS

Figure 1:
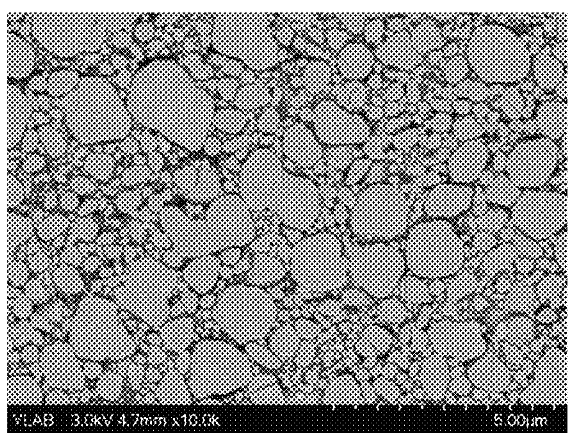
FIG. 1 is a scanning electron microscope image of a cross section of a positive electrode film layer in an electrode plate thickness direction according to an implementation of the present application.

1—battery pack; 2—upper box; 3—lower box; 4—battery module; 5—secondary battery; 51—case; 52—electrode assembly; and 53—cover plate.

DETAILED DESCRIPTION

Embodiments of a lithium-ion secondary battery, a battery apparatus, and an electrical apparatus of the present application will be specifically disclosed in detail below as appropriate with reference to the accompanying drawings. However, there may be situations where unnecessary detailed illustrations are omitted. For example, there are cases in which detailed explanations of well-known matters and repeated explanations of actually the same structure are omitted. Thus, the following illustrations do not become unnecessarily lengthy, which facilitates understanding by those skilled in the art. In addition, the accompanying drawings and subsequent descriptions are provided for those skilled in the art to fully understand the present application, and are not intended to limit the subject matter recited in the claims.

A "range" disclosed in the present disclosure is defined in a form of a lower limit and an upper limit. A given range is defined by selecting a lower limit and an upper limit, and the selected lower limit and upper limit define boundaries of a particular range. The range defined in this way may include or exclude end values, and may be arbitrarily combined, that is, any lower limit may be combined with any upper limit to form a new range. For example, if ranges of 60 to 120 and 80 to 110 are listed for specific parameters, it is also expected to be understood as ranges of 60 to 110 and 80 to 120. In addition, if the minimum range values 1 and 2 and the maximum range values 3, 4 and 5 are listed, the following ranges are all contemplated: 1 to 3, 1 to 4, 1 to 5, 2 to 3, 2 to 4 and 2 to 5. In the present disclosure, unless otherwise specified, a numerical range "a to b" represents an abbreviated representation of any combination of real numbers between a to b, where both a and b are real numbers. For example, the numerical range "0 to 5" represents that all real numbers between 0 and 5 are listed herein, and "0 to 5" is merely the abbreviated representation of the combination of these numbers. In addition, when a parameter is expressed as an integer greater than or equal to 2, it is equivalent to disclosing that the parameter is an integer such as 2, 3, 4, 5, 6, 7, 8, 9, 10, 11, 12, or the like.

Unless otherwise specified, all the examples and optional examples of the present application can be combined with each other to form new technical solutions, and such technical solutions should be considered to be included in the disclosure of the present application.

Unless otherwise specified, all the technical features and optional technical features of the present application can be combined with each other to form new technical solutions, and such technical solutions should be considered to be included in the disclosure of the present application.

Unless otherwise specified, all the steps in the present application can be performed in the order or in a random order, and preferably in the order. For example, the method including steps (a) and (b) indicates that the method may include steps (a) and (b) performed sequentially, or the method may include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), or the like.

In the present application, the term "a plurality of" or "a plurality of types of" indicates two or more.

Unless otherwise stated, the terms used in the present application have well-known meanings as commonly understood by those skilled in the art.

Unless otherwise stated, the values of the parameters mentioned in the present application may be measured by various test methods commonly used in the art, and for example, may be measured according to the test methods given in the examples of the present application. Unless otherwise stated, the testing temperature for each parameter is 25° C.

A battery mentioned in an embodiment of the present application may be a single physical module including one or more lithium-ion secondary batteries to provide a higher voltage and a higher capacity. For example, the battery provided in the present application may include a lithium-ion secondary battery, a battery cell, a battery module, a battery pack, or the like.

Figure 2:
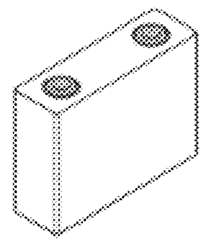
FIG. 2 is a schematic diagram of a lithium-ion secondary battery according to an implementation of the present application.

The lithium-ion secondary battery is the smallest unit constituting the battery, and can achieve functions of charging and discharging independently. The lithium-ion secondary battery may be cylindrical, cuboid or in another shape, which is not limited in the embodiments of the present application. For example, FIG. 2 shows a lithium-ion secondary battery 5 having a rectangular structure as an example.

The lithium-ion secondary battery includes an electrode assembly and an electrolyte.

The lithium-ion secondary battery may further include an outer package, and the outer package may be configured to encapsulate the electrode assembly and the electrolyte. The outer package may be a hard shell, for example, a hard plastic shell, an aluminum shell, or a steel shell. The outer package may also be a soft pack, for example, a pouch type soft pack. The material of the soft pack may be plastic, for example, one or more of polypropylene (PP), polybutylene terephthalate (PBT), and polybutylene succinate (PBS).

Figure 3:
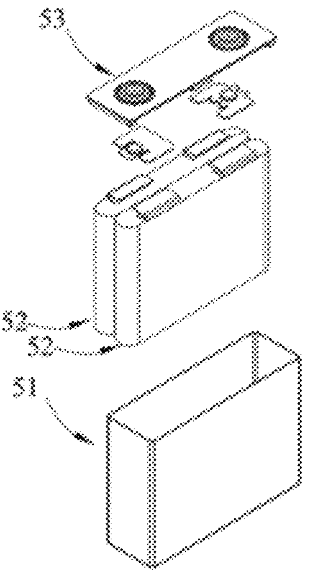
FIG. 3 is a schematic exploded view of a lithium-ion secondary battery according to an implementation of the present application.

In some implementations, as shown in FIG. 3, the outer packaging may include a case 51 and a cover plate 53. The case 51 may include a bottom plate and a side plate connected to the bottom plate. The bottom plate and the side plate enclose an accommodating cavity. The case 51 is provided with an opening in communication with the accommodating cavity, and the cover plate 53 is used for covering the opening to close the accommodating cavity. The electrode assembly 52 is encapsulated in the accommodating cavity. The number of electrode assemblies 52 included in the lithium-ion secondary battery 5 may be one or more, and may be determined according to requirements.

The electrode assembly usually includes a positive electrode plate and a negative electrode plate. The negative electrode plate is an electrode on which a reaction of taking up lithium ions or being lithiated during charging and releasing lithium or being delithiated during discharging occurs. The positive electrode plate is an electrode on which a reaction of releasing lithium ions or being delithiated during charging and taking up lithium or being lithiated during discharging occurs.

When there are a plurality of lithium-ion secondary batteries, the plurality of lithium-ion secondary batteries are connected in series, in parallel, or in a series-parallel mixed manner by using a bus component. In some implementations, a battery may be a battery module. When there are a plurality of lithium-ion secondary batteries, the plurality of lithium-ion secondary batteries are arranged and fixed to form a battery module. In some implementations, the battery may be a battery pack. The battery pack includes a box and a lithium-ion secondary battery, and the lithium-ion secondary battery or the battery module is accommodated in the box. In some implementations, the box may be used as a part of a chassis structure of a vehicle. For example, a part of the box may be at least a part of a floor of the vehicle, or a part of the box may be at least a part of a cross beam and a longitudinal beam of the vehicle.

In some implementations, the battery may be an energy storage apparatus. The energy storage apparatus includes an energy storage container, an energy storage electric cabinet, and the like.

Figure 4:
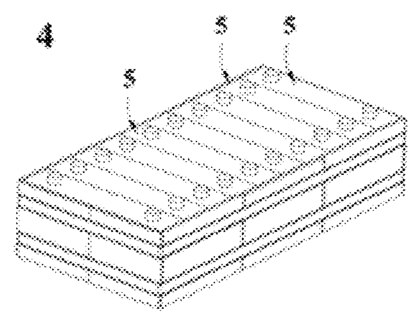
FIG. 4 is a schematic diagram of a battery module according to an implementation of the present application.

In some implementations, the lithium-ion secondary batteries may be assembled into a battery module. The battery module may contain a plurality of lithium-ion secondary batteries, and the specific number may be adjusted according to the application and capacity of the battery module. FIG. 4 is a schematic diagram of a battery module 4 as an example. As shown in FIG. 4, in the battery module 4, a plurality of lithium-ion secondary batteries 5 may be sequentially arranged in a length direction of the battery module 4, and Certainly, the plurality of lithium-ion secondary batteries may alternatively be arranged in any other manner. The plurality of lithium-ion secondary batteries 5 may further be fixed through a fastener.

Optionally, the battery module 4 may further include a shell with an accommodating space. The plurality of lithium-ion secondary batteries 5 may be accumulated in the accommodating space.

In some implementations, the battery module may alternatively be assembled into a battery pack. A quantity of the battery modules included in the battery pack may be adjusted according to the application and capacity of the battery pack.

Figure 5:
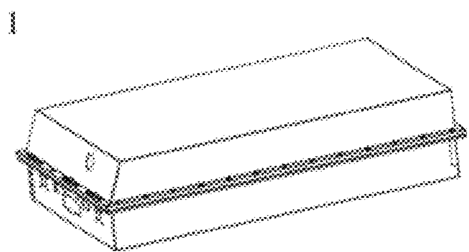
FIG. 5 is a schematic diagram of a battery pack according to an implementation of the present application.
Figure 6:
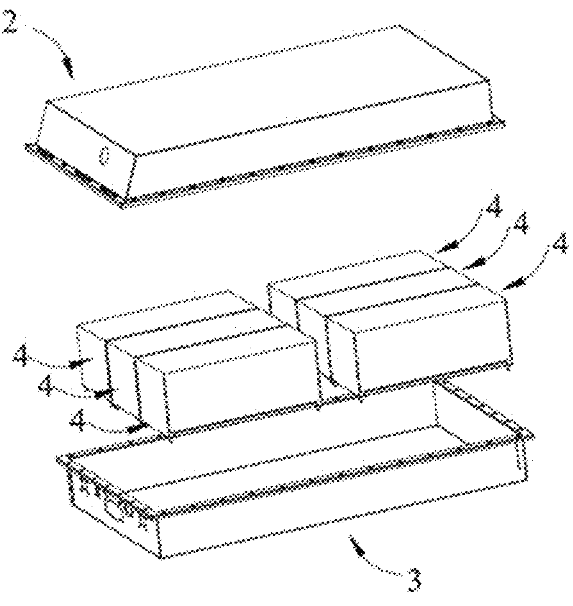
FIG. 6 is a schematic exploded view of the battery pack shown in FIG. 5.

FIG. 5 and FIG. 6 are schematic diagrams of a battery pack 1 as an example. As shown in FIG. 5 and FIG. 6, the battery pack 1 may include a box body and a plurality of battery modules 4 arranged in the box body. The box body includes an upper box 2 and a lower box 3. The upper box 2 is configured to cover the lower box 3 and form an enclosed space for accommodating the battery modules 4. The plurality of battery modules 4 may be arranged in the box body in any manner.

Because of the features of a stable structure, good safety, and a long cycle life, a lithium-containing transition metal phosphate material has been widely used in a lithium-ion battery. However, the lithium-containing transition metal phosphate material has problems of low electronic conductivity and low packing efficiency. Consequently, it is difficult to effectively increase the loading amount of the lithium-containing transition metal phosphate in the battery per unit volume, and the requirement for a battery with a high energy density cannot be satisfied.

To further improve the energy density of the battery and improve the compacted density of the electrode plate, a common manner in the industry is to improve particle grading. A common method for improving particle grading in the existing technology is increasing the proportion of large particles, so as to form a packing skeleton, thereby achieving a structural support function. However, researches indicate that an increase in the proportion of large particles prolongs a lithium ion diffusion path, and degrades the dynamic performance of the battery. Therefore, how to obtain a battery with both high energy density and high dynamic performance is a technical problem that needs to be resolved urgently in the art.

A first aspect of the present application provides a lithium-ion secondary battery. The lithium-ion secondary battery includes a positive electrode plate, a negative electrode plate, and an electrolyte, where the positive electrode plate includes a positive electrode current collector and a positive electrode film layer arranged on at least one side of the positive electrode current collector; the positive electrode film layer includes a positive electrode active material, and the positive electrode active material includes lithium-containing transition metal phosphate particles, at least some surfaces of which are provided with a carbon coated material; and in a cross section of the positive electrode film layer in an electrode plate thickness direction, $D_{A90}$ of the particles ranges from 1400 nm to 2100 nm, and a particle size concentration ratio $(D_{A90}-D_{A10})/D_{A50}$ ranges from 1.855 to 2.375, where $D_{A90}$, $D_{A50}$, and $D_{A10}$ refer to corresponding particle sizes of particles when area cumulative distributions of the particles reach 90%, 50%, and 10% in an area cumulative distribution curve of the particles.

In the existing technology, the particle size concentration ratio of the particles in the positive electrode film layer is usually increased to improve a compacted density of the electrode plate and increase an energy density of a battery. However, research shows that different from cognition in the existing technology, in the cross section of the positive electrode film layer along the electrode plate thickness direction, an excessively large particle size concentration ratio has a limited effect on improving compaction of the electrode plate, and it is difficult to further improve compaction of the electrode plate by adjusting the particle size concentration ratio. The particle size concentration ratio of the particles is less than 1.855, representing that the particle size distribution difference is relatively small, the grading effect is insignificant, and there is a lack of relatively small particles that fill gaps between relatively large particles. After the concentration ratio exceeds 2.375, it means that the size difference between the active material particles is significant, so that optimal close packing cannot be implemented on the positive electrode film layer, and it is difficult to further improve the compacted density of the electrode plate. In the existing technology, a common manner of adjusting the particle size concentration ratio is increasing the sizes or proportion of large particles. However, the applicant further finds, through research, that when the $D_{A90}$ of the particles in the positive electrode film layer is greater than 2100 nm, the large particles in the positive electrode film layer significantly worsens the dynamic performance of the battery.

In the present application, by controlling the particle size concentration ratio $(D_{A90}-D_{A10})/D_{A50}$ of the particles in the positive electrode film layer to range from 1.855 to 2.375, and $D_{A90}$ to range from 1400 nm to 2100 nm, a high dynamic performance of the battery is maintained while a particle packing condition in the positive electrode film layer is improved, a compacted density of the electrode plate is increased, and an energy density of the battery is improved, thereby considering both the dynamic performance and the energy density of the battery.

The lithium-containing transition metal phosphate refers to a phosphate material including a lithium element and a transition metal element, and may be detected in any well-known manner in the art. For example, the lithium-containing transition metal phosphate may be detected by using a combination of an X-ray diffractometer (XRD) and an energy spectrum analyzer.

The carbon coated material arranged on at least a part of the surface of the lithium-containing transition metal phosphate may be detected in any well-known manner in the art. As an example, the carbon coated material arranged on at least a part of the surface of the lithium-containing transition metal phosphate can be observed by using a combination of a transmission electron microscope and an energy spectrum analyzer to represent the lithium-containing transition metal phosphate.

In the present application, the term "particle" refers to a particle whose complete boundary can be identified in the field of view of the positive electrode film layer at a magnification, for example, 10 thousand times. A defect or a scratch may exist in the particle, but a complete boundary sufficient for dividing the particle cannot be identified in the particle.

The particle identification method is specifically as follows: segmenting the positive electrode film layer in the electrode plate thickness direction by using an argon ion beam (as an example, device model: Leica EM TIC 3X CP, working voltage: 6 kV, and working duration: 6 h may be selected), and after the cross section is exposed, observing the cross section of the positive electrode film layer in the electrode plate thickness direction by using a scanning electron microscope (as an example, device model: Hitachi SU8230, working voltage: 3 kV, beam current: high, and probe model: U(LA100), and working distance <5 mm may be selected). An image is collected by using a field emission scanning electron microscope in a secondary electron mode at a non-edge position (after an edge of an electrode plate is observed under the scanning electron microscope, a field of view is adjusted to a central part of a sample) in the cross section of the positive electrode film layer. An electron microscope image is captured at a magnification of 10 k times, and particles in the electron microscope image are analyzed by using ImageJ software (1.46r, win64 version). A method for using the ImageJ software is specifically as follows: A to-be-analyzed scanning electron microscope image is loaded, as shown in FIG. 1; the Cellpose plug-in software therein is used to identify a particle, and manual calibration is performed based on the particle; and Image J is used to read and collect statistics on data. A specific method for identifying a particle by using the Cellpose plug-in software is as follows: A segmentation diameter parameter (diameter in the Segmentation module) is set to 15 pixels, and "run cyto3" is clicked to perform particle identification; and then a particle that cannot be identified by the software, that cannot be completely identified by the software, or that is identified to have an error in the image is manually identified. A particle that cannot be identified by the software, that cannot be completely identified by the software, or that is identified to have an error in the image includes the following types: 1. Because the particle is excessively large or the particle has a scratch on a surface, the particle cannot be identified or cannot be completely identified. 2. During the segmentation of the argon ion beam, a scratch may be generated on a surface of the particle, and during an identification process, the software may incorrectly determine the scratch as a particle boundary, thereby generating an identification error. 3. Because the particle is excessively small, the particle is not successfully identified. 4. The particle is located at an edge of a field of view of an electron microscope, the inside of the particle is intersected by the edge, a topography cannot be completely presented, and a local part instead of an entire part is identified, causing an identification error. The foregoing particle that is not identified or has an identification error is manually calibrated, and a specific process is as follows: deleting a particle that fails to be completely displayed and that is located at a peripheral edge of the scanning electron microscope; determining whether there is a gap scratch in another particle that is not identified or has an identification error, and if there is no gap scratch in the particle, determining that the particle is a particle, and manually identifying the particle according to a particle boundary observed manually; and determining, in response to that there is a gap scratch inside the particle, whether the gap scratch penetrates through the particle, and determining, if the gap scratch does not penetrate through the particle, that the gap scratch is a particle, and performing manual identification; and determining, in response to that the gap scratch runs through the particle, whether the gap scratch is linear or in an irregular shape; determining, in response to that the gap scratch is in an irregular shape, that the gap scratch is a boundary between particles, and performing particle division along the boundary; in response to that the gap scratch is linear, performing contrast comparison; in response to that the contrast comparison is not obvious and there is no crack feeling, determining that the gap scratch is a scratch, and identifying the gap scratch as a particle; and determining, in response to that the contrast comparison is strong and has a crack feeling, the gap scratch as a boundary between particles, and identifying the gap scratch as two particles. Information unrelated to particles in an automatic processing process of the image is deleted after the manual identification, that is, determining and identification of the particles in the image are completed.

In some implementations, $D_{A90}$ of the particles in the cross section of the positive electrode film layer in the electrode plate thickness direction ranges from 1400 nm to 2100 nm.

A calculation manner of $D_{A90}$ of the particles in the cross section of the positive electrode film layer in the electrode plate thickness direction is specifically as follows: An image obtained after particle determining and identification are completed is imported into the ImageJ software for analysis, setting of a scale is completed according to a scanning electron microscope image, and a particle size and an area of a particle in a cross section of the positive electrode film layer in an electrode plate thickness direction are analyzed by using "Feret diameter", "Area", "Round", and "Solidity" analysis functions. According to a software manual (ImageJ User Guide IJ 1.46r), the parameter "Feret" obtained through analysis represents a maximum distance between all parallel lines in the two-dimensional projection of the particle, and the maximum distance represents the particle size of the particle; and an "Area" parameter obtained represents a pixel area of a particle. Particles having particle sizes of less than 50 nm have a relatively large error in a statistical process, and are difficult to be accurately identified. In addition, the particle size of the conductive agent is generally less than 50 nm, and a relatively large error may be generated to a statistical result. Therefore, none of particles having particle sizes of less than 50 nm is counted in the particle size statistical process of the present application, and particle statistics data corresponding to a case that AR, Round, or Solidity is displayed as "NaN" is deleted. According to the foregoing method, to satisfy the number of samples having statistical significance, not less than 10 scanning electron microscope images whose fields of view do not overlap are collected from each electrode plate, and the particle sizes of not less than 5000 particles are counted. The particle sizes of the obtained particles in the at least 5000 particles are arranged in ascending order, and the area cumulative distribution curve of the particles in the positive electrode film layer is obtained by using the particle size as a horizontal axis and a cumulative area proportion that is calculated by using the "Area" of the particles as a vertical axis. $D_{A90}$, $D_{A50}$, and $D_{A10}$ are corresponding particle size values when cumulative area proportions on the vertical axis are 90%, 50%, and 10% respectively in the area cumulative distribution curve.

In some implementations, $D_{A90}$ of the particles in the cross section of the positive electrode film layer in the electrode plate thickness direction is optionally 1400 nm, 1486 nm, 1500 nm, 1556 nm, 1600 nm, 1674 nm, 1700 nm, 1800 nm, 1900 nm, 1984 nm, 2000 nm, or 2100 nm, or in a value range between any two thereof.

A topographic image of the cross section of the positive electrode film layer in an electrode plate thickness direction is shown in FIG. 1, is different from the state of the positive electrode active material in a Malvern laser scattering method, and is also different from the state of the positive electrode active material when the positive electrode active material is directly observed by using a scanning electron microscope. Particles in the positive electrode film layer are in a well dispersed state under rolling pressure. Observation of the positive electrode film layer helps to effectively represent an objective condition of the particle sizes and distribution of the particles in the positive electrode film layer.

In a compaction process, the positive electrode film layer is compacted in the thickness direction, and compared with the surface of the positive electrode film layer, a cross section of the positive electrode film layer in the electrode plate thickness direction can better reflect a real compaction status of particles inside the film layer on a space scale. $D_{A50}$ of the particles in the cross section of the positive electrode film layer in the electrode plate thickness direction can visually reflect the sizes of the whole particles.

In some implementations, in a cross section of the positive electrode film layer in an electrode plate thickness direction, a particle size concentration ratio $(D_{A90}-D_{A10})/D_{A50}$ ranges from 1.855 to 2.375.

In some implementations, in a cross section of the positive electrode film layer in an electrode plate thickness direction, a particle size concentration ratio $(D_{A90}-D_{A10})/D_{A50}$ is optionally 1.855, 1.86, 1.87, 1.88, 1.89, 1.9, 1.91, 1.92, 1.93, 1.94, 1.948, 1.95, 1.96, 1.97, 1.98, 1.99, 2.0, 2.01, 2.02, 2.03, 2.031, 2.04, 2.05, 2.06, 2.07, 2.08, 2.09, 2.10, 2.11, 2.12, 2.13, 2.14, 2.15, 2.16, 2.17, 2.18, 2.19, 2.2, 2.21, 2.22, 2.23, 2.24, 2.25, 2.26, 2.27, 2.28, 2.29, 2.3, 2.31, 2.32, 2.33, 2.34, 2.341, 2.35, 2.36, 2.37, or 2.375, or in a value range between any two thereof.

In the present application, in the cross section of the positive electrode film layer in the electrode plate thickness direction, the particle size concentration ratio may be tested with reference to the foregoing manner. The particle size concentration ratio falls within the foregoing range, helping to construct a proper particle grading. In the positive electrode plate, a wide particle size distribution usually helps to improve a compacted density of the electrode plate. Specifically, the relatively wide particle size distribution enables the relatively small particles to fill the gaps between the relatively large particles, so that the particles form a closer arrangement in a pressing process. Such close arrangement is beneficial to increase a compacted density of the electrode plate, thereby improving the energy density of the battery.

It may be understood that, particles in a cross section of the positive electrode film layer in an electrode plate thickness direction, especially particles above 50 nm, mainly originate from the positive electrode active material. Therefore, in this embodiment of the present application, through observation and statistics collection on the particle sizes of the particles in the cross section of the positive electrode film layer, a distribution status of the lithium-containing transition metal phosphate particles in the positive electrode film layer in the electrode plate can be accurately and objectively reflected.

In the existing technology, statistics on the particle size of the positive electrode active material is usually collected through a Malvern laser diffraction method by using a laser particle size analyzer. However, researches of the applicant indicate that because the lithium-containing transition metal phosphate particles are prone to agglomeration, a particle size of a particle agglomerate thereof is usually measured by using a test result obtained by using a Malvern laser diffraction method according to a laser scattering principle, and cannot truly reflect particle sizes of the particles in the positive electrode active material, and even cannot reflect a dispersion state of the positive electrode active material in the film layer, because a dispersion degree of the positive electrode active material in the film layer increases in film forming, and rolling processes. The test result obtained through the Malvern laser diffraction method is affected by the particle size, the specific surface area, and the agglomeration degree of the positive electrode active material. Compared with a true dispersed case in the electrode plate, the quantity of large particles obtained through the test is lower than an actual value, and the quantity of small particles obtained through the test is higher than an actual value. Therefore, the particle size obtained through the test with the Malvern laser Diffraction method cannot be equivalent to or analogized to the particle size obtained through statistics collection in this embodiment of the present application.

A person skilled in the art may control the particle size concentration ratio of the particle, $D_{A90}$, $D_{A10}$, and $D_{A50}$ by using any known process. As an example, the particle size concentration ratio is adjusted by scientifically grading particles of different particle sizes; the raw material is processed into a target particle size distribution range through mechanical action of a crushing and grinding process, to adjust particle sizes and a concentration ratio of particles; particle size separation is performed on the particle system by using a sifting and grading device, so as to obtain a particle size distribution satisfying a requirement; and a feed rate is accurately controlled, and a residence time and a force-bearing state of particles in the device are regulated, which also facilitates regulation of the particle concentration ratio.

In some implementations, $D_{A90}$ of the particles in the cross section of the positive electrode film layer in the electrode plate thickness direction ranges from 1400 nm to 2000 nm.

$D_{A90}$ of the particle sizes of the particles in the cross section of the positive electrode film layer in the electrode plate thickness direction falling within the foregoing range can reduce internal resistance of the battery, and further suppress negative impact of excessively large particles on the dynamic performance.

In some implementations, $D_{A50}$ of the particles in the cross section of the positive electrode film layer in the electrode plate thickness direction ranges from 600 nm to 900 nm, and optionally ranges from 650 nm to 750 nm.

In some implementations, the particle size $D_{A50}$ in the cross section of the positive electrode film layer in the electrode plate thickness direction is optionally 600 nm, 610 nm, 620 nm, 630 nm, 640 nm, 650 nm, 656 nm, 660 nm, 670 nm, 680 nm, 688 nm, 690 nm, 700 nm, 708 nm, 710 nm, 719 nm, 720 nm, 730 nm, 740 nm, 750 nm, 757 nm, 760 nm, 770 nm, 780 nm, 785 nm, 790 nm, 800 nm, 810 nm, 820 nm, 830 nm, 840 nm, 850 nm, 860 nm, 870 nm, 880 nm, 890 nm, or 900 nm, or in a value range between any two thereof.

$D_{A50}$ of the particle sizes of the particles falling within the foregoing range is beneficial to, on one hand, maintaining a support function of the particles, so that the rolling pressure is transmitted evenly among the particles of the electrode plate, and the electrode plate withstands a higher rolling pressure; and indicates, on the other hand, that the overall particle sizes of the particles inside the positive electrode film layer is relatively small, so that the dynamic performance is maintained at a relatively high level, and the energy density is improved in consideration of the dynamics of the battery.

In some implementations, $D_{A50}$ of the particles in the cross section of the positive electrode film layer in the electrode plate thickness direction ranges from 650 nm to 750 nm, which is beneficial to further considering the dynamic performance of the lithium-ion secondary battery.

In some implementations, $D_{A10}$ of the particles in the cross section of the positive electrode film layer in the electrode plate thickness direction ranges from 100 nm to 300 nm, and optionally ranges from 120 nm to 250 nm.

In some implementations, $D_{A10}$ of the particles in the cross section of the positive electrode film layer in the electrode plate thickness direction is optionally 100 nm, 110 nm, 120 nm, 122 nm, 130 nm, 140 nm, 150 nm, 160 nm, 170 nm, 180 nm, 186 nm, 190 nm, 200 nm, 210 nm, 214 nm, 220 nm, 225 nm, 230 nm, 240 nm, 250 nm, 260 nm, 262 nm, 270 nm, 280 nm, 290 nm, or 300 nm, or in a value range between any two thereof.

$D_{A10}$ of the particles in the cross section of the positive electrode film layer in the electrode plate thickness direction falling within the foregoing range indicates, on one hand, that the film layer has small particles to form grading to fill gaps between the particles, and does not cause agglomeration because the particles are excessively small; and indicates, on the other hand, that the proportion of particles in small particle sizes is limited, which can improve the compaction of the electrode plate and reduce the side reaction between the small particles and the electrolyte, and also consider the cycle performance of the battery.

In some implementations, $D_{A10}$ of the particles in the cross section of the positive electrode film layer in the electrode plate thickness direction ranges from 120 nm to 250 nm, which is beneficial to further improving the cycle performance of the lithium-ion secondary battery.

In some implementations, in a graphitization degree C value cumulative distribution curve of the positive electrode film layer that is obtained in a laser micro-confocal Raman spectrometer surface scanning mode, a graphitization degree median $C_{50}$ ranges from 0.98 to 1.20, and optionally ranges from 1.02 to 1.10; and a graphitization degree C value is $I_G/I_D$, where $I_G$ represents an intensity of a G peak at $1580\pm100\ cm^{-1}$ of a Raman spectrum, and $I_D$ represents an intensity of a D peak at $1350\pm100\ cm^{-1}$ of the Raman spectrum.

In the present application, the graphitization degree C value of the positive electrode film layer may be obtained in a laser micro-confocal Raman spectrometer surface scanning mode. As an example, specifically, a laser micro-confocal Raman spectrometer (a high-precision Renishaw laser micro-confocal Raman spectrometer) is used, an excitation wave length of 532 nm is selected, an appropriate amount of positive electrode film layer is selected, surface scanning is performed on the surface of the positive electrode film layer or a cross section in the electrode plate thickness direction, a scanned region is 45 μm×45 μm, and is divided into 10×10 grids, a grid vertex is used as a test point, a step length is 5 μm, and a total quantity of scanned points is 100. In this way, a cumulative distribution curve of C values at different sites and a cumulative distribution curve of C values at the scanned region are obtained.

The positive electrode film layer in the present application may be a freshly prepared positive electrode film layer, or may be a positive electrode film layer obtained by disassembling the battery. The surface of the positive electrode film layer obtained by disassembling the battery unavoidably has residual electrolyte salt particles. To improve testing accuracy, preferably, the cross section of the positive electrode film layer in the electrode plate thickness direction is subject to surface scanning, to represent the graphitization degree of the positive electrode film layer.

The graphitization degree C value of the positive electrode film layer is obtained by using a peak intensity ratio of a G peak (G-band) to a D peak (D-band) of a Raman spectrum, where a position of the G peak is $1580\pm100\ cm^{-1}$, which represents a carbon $sp^2$ hybridization structure; and a position of the D peak is $1350\pm100\ cm^{-1}$, which represents a disordered structure, where the disordered represents an irregular arrangement manner between carbon atoms in the structure. In a graphitic crystal, carbon atoms at a same layer form a covalent bond through $sp^2$ hybridization, and a van der Waals force exists between layers, so that the carbon of the graphitic structure easily slips. Therefore, the C value may represent the graphitization degree of the positive electrode film layer. It may be understood that the graphitization degree in the positive electrode film layer is mainly derived from the carbon material graphitized in the positive electrode film layer, that is, the carbon coated material of the positive electrode active material. Although the conductive agent such as a carbon nanotube rich in an $sp^2$ hybridization structure also has relatively high $I_G/I_D$, because the carbon nanotube conductive agent has a small added content and a small tube diameter, the addition of the carbon nanotube conductive agent to the positive electrode film layer is shown as an extreme value in a Raman surface scanning test of the positive electrode film layer, and does not affect the graphitization degree $C_{50}$ in the positive electrode film layer. Therefore, the graphitization degree of the positive electrode film layer can also be used for representing the graphitization degree of the positive electrode active material.

The graphitization degree C value cumulative distribution curve is a curve obtained by arranging the obtained at least 100 C values in ascending order, and using the graphitization degree as a horizontal axis and the cumulative quantity proportion as a vertical axis. $C_{50}$ is a C value corresponding to a case that a cumulative quantity proportion on the vertical axis in the graphitization degree C value cumulative distribution curve is 50%. The graphitization degree median $C_{50}$ can reflect the graphitization degree, that is, the slip ease degree, of the whole particles of the positive electrode active material in the positive electrode film layer compared with a point value; and can reduce impact of an extreme value in a test process compared with an average value, thereby improving confidence of a test result.

A person skilled in the art may control the graphitization degree of the active material particles by using any known process. For example, the graphitization degree of the active material particles can be adjusted by regulating each of the carbon source (cross-linked PEG may be selected as the carbon source), the sintering temperature, the sintering time, the sintering pressure, the sintering atmosphere, and the nucleation process.

A higher graphitization degree of carbon on the surface of the positive electrode active material indicates a higher proportion of carbon of the graphitic structure in the positive electrode film layer, and the particles are more likely to slip in a rolling process with the help of the carbon structure having a high graphitization degree in the coated material. Based on proper grading of the particles in the electrode plate, the compacted density of the electrode plate can still be further improved even with a low rolling pressure. The high graphitization degree of the surface coated carbon layer of the positive electrode active material is beneficial to electron transport, thereby considering both the energy density and the dynamics.

In some implementations, in a graphitization degree C value cumulative distribution curve of the positive electrode film layer that is obtained in a laser micro-confocal Raman spectrometer surface scanning mode, a graphitization degree median $C_{50}$ is optionally 0.98, 0.99, 1, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20, or in a value range between any two thereof.

In some implementations, in the sphericity area cumulative distribution curve of the particles that are obtained from the cross section of the positive electrode film layer in the electrode plate thickness direction, the sphericity median $L_{A50}$ ranges from 0.70 to 0.85, and optionally ranges from 0.70 to 0.76.

A method for testing a sphericity median $L_{A50}$ in the cross section of the positive electrode film layer in the electrode plate thickness direction is specifically as follows:

identifying the particles in the cross section of the positive electrode film layer with reference to the foregoing method of the present application; and analyzing the morphology of the particles and the area of the particles in the cross section of the positive electrode film layer in the electrode plate thickness direction by using the analysis functions "shape description" and "Area" in ImageJ. According to the software manual (ImageJ User Guide IJ 1.46r), an "Area" parameter obtained through analysis represents a pixel area of a particle, and a "Round" parameter represents a ratio of the pixel area of the particle to the area of a circle that uses a fitted long diameter as a diameter. When the particle is closer to being spherical, the ratio of the pixel area to the area of the circle that uses the fitted long diameter as the diameter is closer to 1. Therefore, the sphericity of the particle is represented by using the "Round" parameter of the particle obtained through analysis. The sphericities of the obtained at least 5000 particles are arranged in ascending order, and the sphericity area cumulative distribution curve of the particles in the positive electrode film layer is obtained by using the sphericity as a horizontal axis and a cumulative area proportion as a vertical axis. $L_{A50}$ is a sphericity L value corresponding to a case that a cumulative area proportion on the vertical axis in the sphericity L value cumulative distribution curve is 50%.

In some implementations, in a sphericity area cumulative distribution curve of particles that are obtained from a cross section of the positive electrode film layer in an electrode plate thickness direction, a sphericity median $L_{A50}$ is optionally 0.70, 0.709, 0.71, 0.719, 0.72, 0.725, 0.726, 0.73, 0.737, 0.74, 0.75, 0.751, 0.76, 0.77, 0.78, 0.79, 0.80, 0.81, 0.82, 0.83, 0.84, or 0.85, or in a value range between any two thereof.

A person skilled in the art may control the sphericity of the particle by using any known process. For example, the sphericity of the particle can be adjusted by performing a process such as grinding, polishing, chemical corrosion, mechanical stirring, pressing, coating, granulating, or addition of a surface active agent, and adjusting process parameters.

Particles whose sphericity median $L_{A50}$ falls within the foregoing range are approximately spherical. This helps the particles maintain good slidability during packing, easily fills gaps between the particles, and can further improve the compacted density of the electrode plate and improve the energy density of the battery.

In some implementations, in a roughness area cumulative distribution curve of the particles that are obtained from the cross section of the positive electrode film layer in the electrode plate thickness direction, a roughness median $R_{A50}$ ranges from 0.92 to 0.96.

A method for testing a roughness median $R_{A50}$ in a roughness area cumulative distribution curve of the particles that are obtained from the cross section of the positive electrode film layer in the electrode plate thickness direction is specifically as follows: identifying the particles in the cross section of the positive electrode film layer with reference to the foregoing method of the present application; and analyzing the morphology of the particles in the cross section of the positive electrode film layer in the electrode plate thickness direction by using the analysis function "shape description" in ImageJ. According to the software manual (ImageJ User Guide IJ 1.46r), the "Solidity" parameter obtained through analysis represents a ratio of a pixel area to a convex area of a particle. Therefore, the roughness of the particle is represented by using the "Solidity" parameter of the particle obtained through analysis. It can be known according to the definition that a roughness closer to 1 indicates a smoother particle. The roughnesses of the obtained at least 5000 particles are arranged in ascending order, and the roughness area cumulative distribution curve of the particles in the positive electrode film layer is obtained by using the roughness as a horizontal axis and a cumulative area proportion as a vertical axis. $R_{A50}$ is a roughness R value corresponding to a case that a cumulative area proportion on the vertical axis in the roughness R value area cumulative distribution curve is 50%.

In some implementations, in a roughness area cumulative distribution curve of the particles that are obtained from the cross section of the positive electrode film layer in the electrode plate thickness direction, a roughness median $R_{A50}$ is optionally 0.92, 0.93, 0.94, 0.95, or 0.96, or in a value range between any two thereof.

A person skilled in the art may control the roughness of the particle by using any known process. For example, the roughness of the particle can be adjusted by performing a process such as grinding, polishing, chemical corrosion, mechanical stirring, pressing, coating, granulating, or addition of a surface active agent, and adjusting process parameters.

The surfaces of the particles having the roughness median $R_{A50}$ within the foregoing range are relatively smooth, the friction between the particles is relatively small, and slippage easily occurs under an external force, thereby further improving a compacted density of the electrode plate and increasing an energy density of the battery.

In some implementations, in a roughness area cumulative distribution curve of the particles that are obtained from the cross section of the positive electrode film layer in the electrode plate thickness direction, a roughness concentration ratio $(R_{A90}-R_{A10})/R_{A50}$ optionally ranges from 0.05 to 0.10.

In some implementations, in a roughness area cumulative distribution curve of the particles that are obtained from the cross section of the positive electrode film layer in the electrode plate thickness direction, a roughness concentration ratio $(R_{A90}-R_{A10})/R_{A50}$ is optionally 0.05, 0.06, 0.07, 0.08, 0.09, or 0.10, or in a value range between any two thereof.

A method for testing a roughness concentration ratio in the roughness area cumulative distribution curve of the particles that are obtained from the cross section of the positive electrode film layer in the electrode plate thickness direction is specifically as follows: Reference is made to the foregoing roughness test method of the present application, and the rest may be deduced by analogy. $R_{A90}$ is an R value corresponding to a case that a cumulative area proportion on the vertical axis in the sphericity R value area cumulative distribution curve is 90%. $R_{A10}$ is an R value corresponding to a case that a cumulative area proportion on the vertical axis in the roughness R value area cumulative distribution curve is 10%. The roughness concentration ratio is represented by $(R_{A90}-R_{A10})/R_{A50}$.

A person skilled in the art may control the roughness of the particle by using any known process. For example, the particle roughness can be adjusted by using each of processes such as grinding, polishing, milling, milligram energy, electroplating, and calendaring, and adjusting each parameter of the process.

A very small value of the roughness concentration ratio indicates high whole roughness consistency of the particles, facilitating relative sliding between the particles, and more easily forming a high-density packing during rolling, increasing a compacted density of the electrode plate and an energy density of the battery.

In some implementations, an iron dissolution rate of the positive electrode film layer ranges from 400 ppm to 1800 ppm.

The iron dissolution rate of the positive electrode film layer may be tested in the following manner. Specifically, after the electrode plate is disassembled from the battery and cleaned, the electrode plate is punched into a small disk having a diameter of 14 mm, a plurality of small disk samples are taken so that a total mass of the samples is approximately 5 g, and the small disk samples are added to 100.3 g of an ascorbic acid solution having a mass concentration of 0.3% (a solvent is ultra pure water). After 5 minutes of stirring at a speed of 500 revolutions per minute, the solution is quickly sucked by using a 5 ml syringe. The solution is filtered into a test tube by using a filter head with an aperture of 0.45 μm. 1 mL of supernatant is sucked by using a pipette, and the supernatant is added to a glass volumetric flask and diluted by 50 times. The test is performed by using an inductively coupled plasma mass spectrometer (ICP-OES), to obtain the iron element concentration in the solution. By using a formula: [(ICP test iron element concentration×solution volume/mass of the solution participating in volume fixing)×100.3 g/(mass of the electrode plate of the small disk−mass of the current collector of the small disk)], the volume of the solution is 50 mL, the mass of the solution participating in volume fixing is 1 g, and the iron dissolution rate of the positive electrode film layer is calculated. Preferably, the mass of the current collector of the small disk is obtained by multiplying the thickness of the small disk by the area and by the density. The thickness of the small disk may be equivalent to the thickness of the current collector of the uncoated region measured by using a thickness gauge. It may be understood that although the current collector is extended in a compaction process of a coated region, resulting in a slight decrease in the thickness compared with an uncoated region, the decrease amplitude is negligible, and therefore does not greatly affect a test result. More preferably, when the current collector is an aluminum foil, the density is 2.7 g/cm$^3$.

In some implementations, an iron dissolution rate of the positive electrode film layer is optionally 400 ppm, 500 ppm, 600 ppm, 700 ppm, 800 ppm, 860.7 ppm, 900 ppm, 1000 ppm, 1100 ppm, 1200 ppm, 1300 ppm, 1400 ppm, 1500 ppm, 1600 ppm, 1700 ppm, or 1800 ppm, or in a value range between any two thereof.

A person skilled in the art may control the iron dissolution rate of the positive electrode active material by using any known process. As an example, the iron dissolution rate of the positive electrode active material is regulated by regulating a surface coverage mass of the positive electrode active material, and a temperature, a time, and a pressure in a preparation process. In addition, during use of the battery, the battery design, the content of the oxidant in the electrolytic solution, the working temperature of the battery, and the charge and discharge intensity of the battery may also affect the iron dissolution rate of the positive electrode film layer.

The iron dissolution rate of the positive electrode film layer is mainly derived from the positive electrode active material with the lithium-containing transition metal phosphate in the positive electrode film layer, and can reflect integrity and density of the carbon coating on the surface of the positive electrode active material from a side. A lower iron dissolution rate means that iron ions obtained after acid dissolution are not easy to precipitate from the carbon coated material, that is, the carbon coated material on the surface of the positive electrode active material is more integral and dense. The iron dissolution rate of the positive electrode film layer is within the foregoing range, representing that the positive electrode active material has a relatively complete and dense carbon coated material, which can improve the electric contact between the positive electrode active materials, improve the conductivity of the positive electrode active materials, reduce the polarization of the positive electrode active materials, and further optimize the dynamic performance of the lithium-ion secondary battery. In addition, the carbon coated material with high integrity enables the particles to be easily stressed to slip in a rolling process, and can improve both a compacted density of the electrode plate and an energy density of the battery.

In some implementations, a mass content of a carbon element based on a total mass of the positive electrode active material ranges from 0.8% to 1.8%, and optionally ranges from 0.9% to 1.5%.

The mass content of the carbon element based on the total mass of the positive electrode active material can be determined by a method and a device known in the art. For example, reference is made to GB/T 21023-2006 "Steel and iron—Determination of total carbon and sulfur content—Infrared absorption method after combustion in an induction furnace", and the measurement is performed by using a Dekai HCS infrared carbon and sulfur analyzer.

In some implementations, a mass content of a carbon element based on a total mass of the positive electrode active material is optionally 0.8%, 0.9%, 1.0%, 1.1%, 1.2%, 1.3%, 1.4%, 1.5%, 1.6%, 1.7%, or 1.8%, or in a value range between any two thereof.

Compared with a positive electrode active material with a lithium-containing transition metal phosphate in the existing technology, the positive electrode active material has a lower content of carbon coating, so that the loading amount of the lithium-containing transition metal phosphate in the positive electrode plate can be further increased, and the energy density of the lithium-ion secondary battery can be improved.

In some implementations, a lithium-iron antisite defect concentration of the positive electrode active material ranges from 0.001% to 1.5%, and optionally ranges from 0.01% to 1.0%.

XRD data of a sample is collected by using an X-ray diffractometer, a material phase of the sample is analyzed, and a CIF file of the material phase obtained from an open source website is used as an initial model of a crystal structure, including defining a unit cell parameter, an atom position, an occupation probability, and the like. In the initial model of the crystal structure, considering a possibility of Fe—Li antisite, a possible amount of Li contained at an Fe position and a possible amount of Fe contained at an Li position are set, and an initial value is set to 0.1%. FullProf Suite software is used to perform fitting and refinement on the collected XRD data, and parameter refinement is performed according to a sequence of a background parameter, a peak intensity, a unit cell parameter, and a peak shape. When the fitted peak shape and the experimental peak shape are best equipped, and Rwp is less than 10, a refined occupation probability of Li and Fe is obtained, and the probability that iron occupies the position of lithium is used as the lithium-iron antisite defect concentration.

In some implementations, a lithium-iron antisite defect concentration of the positive electrode active material is optionally 0.001%, 0.01%, 0.02%, 0.03%, 0.04%, 0.05%, 0.06%, 0.07, 0.08%, 0.09%, 0.1%, 0.2%, 0.22%, 0.3%, 0.4%, 0.5%, 0.6%, 0.7%, 0.8%, 0.9%, 1.0%, 1.1%, 1.2%, 1.3%, 1.4%, or 1.5%, or in a value range between any two thereof.

A person skilled in the art may control the lithium-iron antisite defect of the positive electrode active material by using any known process. As an example, the lithium-iron antisite defect of the positive electrode active material can be regulated by regulating a sintering temperature, a sintering time, a preparation method, a stoichiometric ratio of raw materials, and the like.

During a preparing and circulating process, unavoidably, some lithium vacancies exist in a crystal structure of the positive electrode active material. The lithium vacancies not only cause ferrous ions to be oxidized to iron ions, but also induce the iron ions to partially migrate to lithium positions, thereby forming a lithium-iron antisite defect, blocking a one-dimensional diffusion channel for the lithium ions, and negatively affecting solid-phase transport of the lithium ions. The positive electrode active material in this embodiment of the present application has a low lithium-iron antisite defect, thereby facilitating uniform transport of lithium ions in a solid phase, and further improving the dynamic performance of the lithium-ion secondary battery.

In some implementations, the lithium-containing transition metal phosphate includes a component having the following general formula:

$$Li_mFe_xP_yO_jQ_q$$

where Q includes one or more of Al, Na, K, Mg, Cu, Mn, Cr, Zn, Pb, Ca, Co, Ni, Sr, Nb, V, Ti, B, S, Si, N, F, Cl, and Br, $0.8 \le m \le 1.15$, $0.9 \le x \le 1$, $0.95 \le y \le 1$, $3.5 \le j \le 4$, and $0 < q \le 0.1$.

In some implementations, m is optionally 0.8, 0.85, 0.9, 0.95, 0.98, 1.00, 1.03, 1.05, 1.08, 1.10, 1.13, or 1.15, or in a value range between any two thereof; x is optionally 0.9, 0.91, 0.92, 0.93, 0.94, 0.95, 0.96, 0.97, 0.98, 0.99, or 1.0, or in a value range between any two thereof; y is optionally 0.95, 0.96, 0.97, 0.98, 0.99, or 1.00, or in a value range between any two thereof; j is optionally 3.5, 3.6, 3.7, 3.8, 3.9, or 4, or in a value range between any two thereof; and q is optionally 0, 0.01, 0.02, 0.03, 0.04, 0.05, 0.06, 0.07, 0.08, 0.09, or 0.1, or in a value range between any two thereof.

Selection of a proper modifying element Q can improve the lattice change rate of the positive electrode active material in a process of lithium intercalation/deintercalation, reduce the oxygen activity on the surfaces of the particles, and improve the structural stability of the material, thereby improving the gram capacity development level of the material in a cycle process, and further improving the cycle stability of the lithium-ion secondary battery.

In some implementations, the positive electrode active material includes one or more of lithium iron phosphate, a doped and modified material thereof, and a coated and modified material thereof.

In some implementations, the positive electrode active material includes a titanium element, and a mass content of the titanium element based on the total mass of the positive electrode active material ranges from 4000 ppm to 8000 ppm.

Types and contents of elements in the positive electrode active material may be tested in any well-known manner in the art. For example, with reference to Appendix C of GB/T 33822-2017, a titanium element and a content are tested through inductively coupled plasma atomic emission spectroscopy.

Doping of the titanium element in the positive electrode active material is beneficial to causing lattice distortion, reducing Li—O bond energy, improving a lithium ion diffusion rate, and improving dynamic performance of the lithium-ion secondary battery. However, in the existing technology, a doping content of the titanium element in the lithium-containing transition metal phosphate usually cannot exceed 3000 ppm, because an excessively large amount of titanium element has difficulty in completely entering a bulk phase of the lithium-containing transition metal phosphate, and easily becomes a harmful impurity phase remaining on the surface, which negatively affects the performance of the battery.

The positive electrode active material in this embodiment of the present application has a high content of the titanium element, and surprisingly, a high addition amount of the titanium element does not form a harmful impurity phase that negatively affects the energy density and the dynamic performance of the battery. Although the reason is unclear, it is presumed that the titanium element may form a fast ion conductor together with a phosphate group and another element (for example, a lithium element), to improve the dynamic performance of the battery.

In some implementations, a powder tapped density of the positive electrode active material ranges from 1.00 g/cm$^3$ to 1.70 g/cm$^3$, and optionally ranges from 1.20 g/cm$^3$ to 1.50 g/cm$^3$.

The powder tapped density may be obtained through testing in any well-known manner in the art. As an example, an electronic balance is turned on, and the electronic balance is zeroed out after a conical flask is used as a base and is placed on the electronic balance; a tapping graduated cylinder is placed on the conical flask, the graduated cylinder is weighed, and the weight of the graduated cylinder is recorded; a sample bag is opened, a sample in the sample bag is first stirred by using a clean sample spoon for 3 to 5 circles and mixed uniformly, and then the sample is smoothly transferred to the graduated cylinder; contaminated powder on a surface of the graduated cylinder is wiped by using an air-laid paper, and then the contaminated powder is placed into the zeroed-out conical flask and weighed; the mouth of the graduated cylinder is sealed by using a sealing film, and the tapping graduated cylinder is placed into a matched instrument rubber ring, to ensure that the tapping density graduated cylinder is tightly attached to the rubber ring and is perpendicular to the surface of the instrument; on the instrument, a vibration frequency is set to 250 times/min, a quantity of vibration times is set to 5000, and a key is pressed to vibrate for 20 min; then, the tapped density graduated cylinder is removed, the surface of the graduated cylinder is irradiated by using a flashlight, the highest scale $V_1$ and the lowest scale $V_2$ are read visually, and an average value V of the two scales is taken; and a mass $m_0$ of the graduated cylinder is subtracted from a mass $m_1$ of the graduated cylinder and the sample, to obtain a mass m of the powder, and a tapped density of the sample is obtained by using a density formula $\rho = m/v$.

In some implementations, the powder tapped density of the positive electrode active material is optionally 1.00 g/cm$^3$, 1.05 g/cm$^3$, 1.10 g/cm$^3$, 1.15 g/cm$^3$, 1.20 g/cm$^3$, 1.25 g/cm$^3$, 1.30 g/cm$^3$, 1.35 g/cm$^3$, 1.40 g/cm$^3$, 1.45 g/cm$^3$, 1.50 g/cm$^3$, 1.55 g/cm$^3$, 1.60 g/cm$^3$, 1.65 g/cm$^3$, or 1.70 g/cm$^3$, or in a value range between any two thereof.

The positive electrode active material particles in this embodiment of the present application not only have a relatively wide particle size distribution, but also have particle sizes within a reasonable interval, forming an effective grading. Small particles can fill gaps between the particles, and therefore have a relatively high tapped density.

In some implementations, a powder compacted density of the positive electrode active material under a pressure of 3T ranges from 2.55 g/cm$^3$ to 2.70 g/cm$^3$, and optionally ranges from 2.58 g/cm$^3$ to 2.68 g/cm$^3$.

In the present application, the term "powder compacted density" refers to a density in unit of g/cm$^3$ of a compact with a specific density and intensity that is formed because relatively large gaps are filled, a contact area between particles is enlarged, an attraction force is generated between atoms, and a mechanical engagement action between the particles is enhanced with movement and deformation of the powder during compression by using an external force.

The powder compacted density of the positive electrode active material may be measured by using a method and a device that are well known in the art. For example, the measurement may be performed by using a compacted density instrument with reference to GB/T 24533-2009. Specifically, a certain amount of positive electrode active material is placed on a compaction dedicated die (the diameter of the die is known), and a metal disk is provided at each of the top and the bottom of the middle hollowness of the die. The positive electrode active material is placed between the metal disks, and a metal cylinder is placed at the top. The die is placed on a compacted density instrument. A pressure is set to 3T. The thickness of the positive electrode active material under the pressure of 3T can be read from the device. The powder compacted density of the positive electrode active material is $\rho = m/v$, where $v = (S \times H)$, m is the mass of the positive electrode active material, S is the bottom area 1.327 cm$^2$ of the die, and H is the thickness of the compacted positive electrode active material.

In some implementations, a powder compacted density of the positive electrode active material under a pressure of 3T is optionally 2.55 g/cm$^3$, 2.56 g/cm$^3$, 2.57 g/cm$^3$, 2.58 g/cm$^3$, 2.59 g/cm$^3$, 2.60 g/cm$^3$, 2.61 g/cm$^3$, 2.62 g/cm$^3$, 2.63 g/cm$^3$, 2.64 g/cm$^3$, 2.65 g/cm$^3$, 2.66 g/cm$^3$, 2.67 g/cm$^3$, 2.68 g/cm$^3$, 2.69 g/cm$^3$, or 2.70 g/cm$^3$, or in a value range between any two thereof.

The positive electrode active material particles form effective grading, so that the positive electrode active material can construct, under an external force, a packed structure with extremely small particle gaps, and can achieve a higher compacted density, thereby providing a material basis for improving a compacted density of the electrode plate and preparing a lithium-ion secondary battery with a high energy density.

In some implementations, a powder resistivity of the positive electrode active material under a pressure of 8 MPa ranges from 0.5 Ω·cm to 60.0 Ω·cm, and optionally ranges from 2.0 Ω·cm to 40.0 ∩·cm.

The powder resistivity of the positive electrode active material may be measured by using a method and a device that are well known in the art. For example, the measurement may be performed by using a powder resistivity meter (Suzhou Lattice, model ST2722) with reference to GB/T 33822-2017. Specifically, a particular amount of positive electrode active material (for example, 1 g) is weighed and added to a feeding cavity of the powder resistivity meter. A pressure of 8 MPa is applied. A forward resistivity and a reverse resistivity of the positive electrode active material are separately tested, and an average value of the forward resistivity and the reverse resistivity is taken as the powder resistivity of the positive electrode active material.

In some implementations, a powder resistivity of the positive electrode active material under a pressure of 8 MPa is optionally 0.5 Ω·cm, 1 Ω·cm, 2 Ω·cm, 3 Ω·cm, 4 Ω·cm, 5 Ω·cm, 6 Ω·cm, 7 Ω·cm, 8 Ω·cm, 9 Ω·cm, 10 Ω·cm, 10.95 Ω·cm, 15 Ω·cm, 20 Ω·cm, 25 Ω·cm, 30 Ω·cm, 35 Ω·cm, 40 Ω·cm, 45 Ω·cm, 50 Ω·cm, 55 Ω·cm, or 60 Ω·cm, or in a value range between any two thereof.

The positive electrode active material coats the surface with the carbon material, and fast conduction of electrons between particles is easily implemented through an sp$^2$ structure of the carbon on the surface, so that the positive electrode active material has a low powder resistivity, which helps to improve a solid-phase transport rate of the electrons and improve the dynamic performance of the battery.

In some implementations, a discharge gram capacity of the positive electrode active material at a room temperature at a discharge rate of 1 C ranges from 135 mAh/g to 150 mAh/g.

In the present application, the positive electrode active material is assembled into a button battery and electric performance of the button battery is tested on a Land tester. After being charged to 3.75 V in a voltage range of 2.0 V to 3.75 V at 25±5° C. with a constant current of 1 C, the battery suspension pauses for 5 minutes, is charged to a cut-off current of 50 μA with a constant voltage, and then is discharged to 2.0 V with a constant current of 1 C. The discharge capacity of the button battery divided by the mass of the positive electrode active material is used as the discharge gram capacity of the positive electrode active material at a room temperature at a discharge rate of 1 C.

A procedure for preparing and testing the button battery is as follows: 2.0 g of positive electrode active material, conductive carbon black, and PVDF are mixed according to a mass ratio of 0.9:0.05:0.05, and then an organic solvent NMP (N-methylpyrrolidone) is added; after the mixing is performed fully and uniformly, the coating is performed by using a scraper of 150 μm, and the drying is performed at 100° C. for 2 h; a positive electrode plate is compacted with a compacted density of 2.0 g/cm$^3$ to 2.2 g/cm$^3$; a disk having a diameter of 14 mm is punched by using a puncher, then the disk is weighed, and the weight is recorded; the weighed positive electrode plate is placed into a vacuum drying oven (105° C., 1 to 12 hrs, −90 kpa); the dried positive electrode plate is placed into a glove box, and is assembled into a battery according to a sequence of negative electrode case-nickel mesh-lithium sheet-separator-positive electrode plate-positive electrode case; 65 to 87 μL of electrolytic solution (where the electrolytic solution is a mixed solvent of EC (ethylene carbonate) and DMC (1,2-dimethyl carbonate) with a volume ratio of 1:1, and an electrolyte is $LiPF_6$) is added drop-wise (with a pipette); the negative electrode is above and placed into a groove of a sealing machine, and a sealing pressure is 650 kg/cm$^2$; the button battery is taken down by using insulation tweezers and is loaded into a dust-free bag; and the glove box is removed, and the button battery is placed into a thermostatic room to stand for 3 h, to obtain a button battery to be tested.

It may be understood that, the discharge gram capacity of the positive electrode active material may also be obtained by disassembling a battery, obtaining a positive electrode plate, assembling the positive electrode plate into a button battery according to the foregoing method, and then testing the button battery.

In some implementations, a discharge gram capacity of the positive electrode active material at a room temperature at a discharge rate of 1 C is optionally 135 mAh/g, 140 mAh/g, 140.8 mAh/g, 145 mAh/g, or 150 mAh/g, or in a value range between any two thereof.

The positive electrode active material has a high discharge gram capacity at a rate of 1 C, indicating that the positive electrode active material has good charging and discharging capabilities, which helps improve the dynamic performance of the battery.

In some implementations, a ratio of a discharge capacity of the positive electrode active material discharged to 3.2 V is $\eta \geq 85\%$, where $\eta$ is defined as follows: a button battery including the positive electrode active material is charged and discharged twice at a constant current with a rate of 0.1 C in a voltage range of 2.0 V to 3.75 V at the room temperature, and then is charged and discharged once at a constant current with a rate of 1 C; and in a charge and discharge test at the rate of 1 C, a capacity value at which a discharge voltage is 3.2 V is extracted and recorded as $C_1$, a capacity value at which a discharge voltage is 2.0 V is extracted and recorded as $C_2$, and $\eta = C_1/C_2$, where a charge process includes constant-voltage charge with a constant voltage of 3.75 V and a constant-voltage cut-off current of 50 μA.

In some implementations, a proportion $\eta$ of a discharge capacity of the positive electrode active material discharged to 3.2 V is ≥88%.

The value $\eta$ of the positive electrode active material may be measured by using a method and a device that are well known in the art. As an example, a button battery is first prepared with reference to the foregoing method. Electrical performance of the prepared button battery is tested on a Land tester at a room temperature. Specifically, the button battery is charged and discharged twice at a constant current of 0.1 C in a voltage range of 2.0 V to 3.75 V, charged to a cut-off voltage at a constant current, then charged to a current of 50 μA at a constant voltage, and then charged and discharged once at a constant current with a rate of 1 C. In a charge and discharge test at a rate of 1 C, a capacity value of being discharged from 3.75 V to a voltage of 3.2 V is recorded as $C_1$, a capacity value of being discharged from 3.75 V to 2.0 V is recorded as $C_2$, and $\eta = C_1/C_2$.

In some implementations, $\eta$ is optionally 85%, 86%, 87%, 88%, 88.1%, 89%, 90%, 90.1%, 91%, 92%, 92.2%, 93%, 94%, 94.1%, 94.5%, 95%, or 95.1%, or in a value range between any two thereof.

In some implementations, a proportion $\eta$ of a discharge capacity of the positive electrode active material in the freshly prepared lithium-ion secondary battery discharged to 3.2 V is ≥88%. After the freshly prepared lithium-ion secondary battery is charged and discharged in a voltage range of 2.0 V to 3.75 V at a constant current with a rate of 0.1 C for a period of time, a ratio $\eta$ of a discharge capacity of the positive electrode active material discharged to 3.2 V may remain ≥85%.

A high ratio of the discharge capacity of the positive electrode active material used in the lithium-ion secondary battery in this embodiment of the present application and discharged to 3.2 V means that the positive electrode active material has good dynamic performance. In addition, a high value of $\eta$ indicates that the lithium-ion secondary battery including the positive electrode active material still has a high voltage when the lithium-ion secondary battery is discharged to a low state of charge (SOC), which is beneficial to maintaining good power performance.

In some implementations, a mass content of a conductive agent based on a total mass of the positive electrode film layer ranges from 0.01% to 1.5%.

In some implementations, a mass content of a conductive agent based on a total mass of the positive electrode film layer is optionally 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 1.1%, 1.2%, 1.3%, 1.4%, or 1.5%, or in a value range between any two thereof.

In some implementations, the conductive agent includes at least one of superconducting carbon, acetylene black, carbon black, Ketjen black, carbon dots, carbon nanotubes, graphene, and carbon nanofibers.

The particles in the positive electrode film layer are closely packed. Therefore, the positive electrode active material particles have the surface coated with the carbon layer with a high graphitization degree and are in sufficient contact with each other, to have good electronic conductivity, which can reduce use of a conductive agent in the positive electrode film layer, thereby helping to further increase a loading amount of the positive electrode active material and improve the energy density of the lithium-ion secondary battery.

In some implementations, the positive electrode film layer further includes a binder, and based on the total mass of the positive electrode film layer, a mass content of the positive electrode active material ranges from 94.0% to 99.4%, and optionally ranges from 96.5% to 99.4%; and a mass content of the binder ranges from 0.5% to 3.0%.

In some implementations, the binder includes at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In some implementations, based on the total mass of the positive electrode film layer, a mass content of the positive electrode active material is optionally 94.0%, 94.5%, 95.0%, 95.5%, 96.0%, 96.5%, 97%, 97.5%, 98%, 98.5%, 99%, or 99.4%, or in a value range between any two thereof.

In some implementations, based on the total mass of the positive electrode film layer, a mass content of the binder is optionally 0.5%, 1.0%, 1.5%, 2.0%, 2.5%, or 3.0%, or in a value range between any two thereof.

The mass content of the positive electrode active material and the mass content of the binder are within the foregoing ranges, so that the loading amount of the active material in the positive electrode film layer per unit volume can be effectively increased, and a good internal bonding force can be maintained, thereby reducing occurrence probabilities of the problems of powder falling, expansion, and cracking, and considering safety performance while improving the energy density of the secondary battery.

In some implementations, a single-sided surface density of the positive electrode film layer ranges from 300 mg/1540 mm$^2$ to 450 mg/1540 mm$^2$.

The "single-sided surface density of the positive electrode film layer" in the present application has a well-known meaning in the art and can be tested using methods known in the art. For example, a positive electrode plate that has a single side coated and that is compacted (if the positive electrode plate has two sides coated, the positive electrode film layer on one of the sides may be first wiped off) is taken and punched into a small disk whose area is $S_1$. The small disk is weighed, and the weight is recorded as $M_1$. Then, the positive electrode film layer of the weighed positive electrode plate is wiped off, the current collector is weighed, and the weight is recorded as $M_0$. The single-sided surface density of the positive electrode film layer=$(M_1-M_0)/S_1$. To ensure accuracy of the test result, a plurality of groups (for example, 10 groups) of to-be-tested samples may be tested, and an average value is calculated as the test result.

In some implementations, the single-sided surface density of the positive electrode film layer is optionally 300 mg/1540 mm$^2$, 310 mg/1540 mm$^2$, 320 mg/1540 mm$^2$, 330 mg/1540 mm$^2$, 340 mg/1540 mm$^2$, 350 mg/1540 mm$^2$, 360 mg/1540 mm$^2$, 370 mg/1540 mm$^2$, 380 mg/1540 mm$^2$, 390 mg/1540 mm$^2$, 400 mg/1540 mm$^2$, 410 mg/1540 mm$^2$, 420 mg/1540 mm$^2$, 430 mg/1540 mm$^2$, 440 mg/1540 mm$^2$, or 450 mg/1540 mm$^2$, or in a value range between any two thereof.

The positive electrode film layer having the surface density within the foregoing range can help improve the energy density of the lithium-ion secondary battery.

In some implementations, in a fully discharged state of the lithium-ion secondary battery, a compacted density of the positive electrode film layer ranges from 2.52 g/cm$^3$ to 2.78 g/cm$^3$.

In some implementations, in a fully discharged state of the lithium-ion secondary battery, a compacted density of the positive electrode film layer ranges from 2.55 g/cm$^3$ to 2.75 g/cm$^3$.

In the present application, the fully discharged state refers to a state in which the battery is placed at 25° C. to stand for 2 h, and after the temperature of the battery is maintained at 25° C., the battery is discharged to 2.5 V at a constant current of ⅓ C and then is discharged to 2.0 V at a constant current of 0.1 C.

The compacted density of the positive electrode film layer can be tested using methods known in the art. As an example, the battery is placed in an oven environment at 25° C. to stand for 2 h until a temperature of the battery is maintained at 25° C. The battery is discharged to 2.5 V with a constant current of ⅓ C and then is discharged to 2.0 V with a constant current of 0.1 C. The battery is disassembled, to obtain a positive electrode plate. The residual electrolytic solution is treated by using a solvent of dimethyl carbonate, the electrode plate is dried, and is cut into a small disk whose area is S, to obtain a mass $W_1$ of the disk, and a thickness $T_1$ of the positive electrode plate is measured by using a micrometer. Then, the positive electrode film layer of the weighed electrode plate is wiped off, a mass of the current collector is weighed, and is recorded as $W_2$, and a thickness $T_2$ of the current collector is measured by using the micrometer. Therefore, the compacted density of the positive electrode film layer is $PD=(W_1-W_2)/[(T_1-T_2)\times S]$.

In some implementations, in a fully discharged state of the lithium-ion secondary battery, a compacted density of the positive electrode film layer is 2.52 g/cm$^3$, 2.53 g/cm$^3$, 2.54 g/cm$^3$, 2.55 g/cm$^3$, 2.56 g/cm$^3$, 2.57 g/cm$^3$, 2.58 g/cm$^3$, 2.59 g/cm$^3$, 2.60 g/cm$^3$, 2.61 g/cm$^3$, 2.62 g/cm$^3$, 2.63 g/cm$^3$, 2.64 g/cm$^3$, 2.65 g/cm$^3$, 2.66 g/cm$^3$, 2.67 g/cm$^3$, 2.68 g/cm$^3$, 2.69 g/cm$^3$, 2.70 g/cm$^3$, 2.71 g/cm$^3$, 2.72 g/cm$^3$, 2.73 g/cm$^3$, 2.74 g/cm$^3$, 2.75 g/cm$^3$, 2.76 g/cm$^3$, 2.77 g/cm$^3$, or 2.78 g/cm$^3$, or in a value range between any two thereof.

In some implementations, the compacted density of the positive electrode film layer after being treated through a compaction process ranges from 2.63 to 2.90 g/cm$^3$.

In some implementations, the compacted density of the positive electrode film layer after being treated through a compaction process is optionally 2.63 g/cm$^3$, 2.64 g/cm$^3$, 2.65 g/cm$^3$, 2.66 g/cm$^3$, 2.67 g/cm$^3$, 2.68 g/cm$^3$, 2.69 g/cm$^3$, 2.70 g/cm$^3$, 2.71 g/cm$^3$, 2.72 g/cm$^3$, 2.73 g/cm$^3$, 2.74 g/cm$^3$, 2.75 g/cm$^3$, 2.76 g/cm$^3$, 2.77 g/cm$^3$, 2.78 g/cm$^3$ g/cm$^3$, 2.79 g/cm$^3$, 2.80 g/cm$^3$, 2.81 g/cm$^3$, 2.82 g/cm$^3$, 2.83 g/cm$^3$, 2.84 g/cm$^3$, 2.85 g/cm$^3$, 2.86 g/cm$^3$, 2.87 g/cm$^3$, 2.88 g/cm$^3$, 2.89 g/cm$^3$, or 2.90 g/cm$^3$, or in a value range between any two thereof.

In the present application, "compacting" means that in a battery assembly process, the positive electrode film layer is compacted through mechanical pressure, so as to improve the compactness and the conductivity thereof.

In some implementations, the compacted density of the positive electrode film layer after being treated through a formation process ranges from 2.52 to 2.78 g/cm$^3$.

In some implementations, the compacted density of the positive electrode film layer after being treated through a formation process is optionally 2.52 g/cm$^3$, 2.53 g/cm$^3$, 2.54 g/cm$^3$, 2.55 g/cm$^3$, 2.56 g/cm$^3$, 2.57 g/cm$^3$, 2.58 g/cm$^3$, 2.59 g/cm$^3$, 2.60 g/cm$^3$, 2.61 g/cm$^3$, 2.62 g/cm$^3$, 2.63 g/cm$^3$, 2.64 g/cm$^3$, 2.65 g/cm$^3$, 2.66 g/cm$^3$, 2.67 g/cm$^3$, 2.68 g/cm$^3$, 2.69 g/cm$^3$, 2.70 g/cm$^3$, 2.71 g/cm$^3$, 2.72 g/cm$^3$, 2.73 g/cm$^3$, 2.74 g/cm$^3$, 2.75 g/cm$^3$, 2.76 g/cm$^3$, 2.77 g/cm$^3$, or 2.78 g/cm$^3$, or in a value range between any two thereof.

In the present application, formation means that in a first charge and discharge process of a battery, a stable solid electrolyte interphase (SEI) film and an electrode structure are formed through an electrochemical reaction.

It may be understood that, with rebound of an electrode plate in a cycle process, a compacted density of the positive electrode film layer in a fully discharged state of the lithium-ion secondary battery is slightly lower than compacted densities of the positive electrode film layer after being compacted and after being formed.

The compacted density of the positive electrode film layer being within the foregoing range helps improve the energy density of the lithium-ion secondary battery.

In some implementations, in a fully discharged state of the lithium-ion secondary battery, the compacted density of the positive electrode film layer ranges from 2.52 g/cm$^3$ to 2.78 g/cm$^3$, and in the cross section of the positive electrode film layer in the electrode plate thickness direction, a porosity of the positive electrode film layer ranges from 10% to 22%.

In some implementations, in a fully discharged state of the lithium-ion secondary battery, the compacted density of the positive electrode film layer ranges from 2.55 g/cm$^3$ to 2.75 g/cm$^3$, and in the cross section of the positive electrode film layer in the electrode plate thickness direction, a porosity of the positive electrode film layer ranges from 10% to 20%.

In some implementations, in the cross section of the positive electrode film layer in the electrode plate thickness direction, a porosity of the positive electrode film layer is optionally 10%, 11%, 12%, 13%, 14%, 15%, 16%, 17%, 18%, 19%, or 20%, or in a value range between any two thereof.

In the cross section of the positive electrode film layer in the electrode plate thickness direction, the porosity of the positive electrode film layer may be tested in the following manner. A scanning electron microscope image of a cross section of the positive electrode film layer in the electrode plate thickness direction obtained in the foregoing manner is imported into ImageJ software, a line tool is selected, a scale length in the image is marked by using a straight line, "Analyze Set Scale" is clicked, and a scale parameter is set in the software according to the scale length in the image. A rectangle tool is selected, a part of the image outside the scale region is selected, the selected region is duplicated by using "Image Duplicate", and the image format is adjusted by using "Image Type 8 bit"; "Analyze Set Measurements" is selected, and the following 5 options are selected: "Area", "Mean gray value", "Area Fraction", "Limit to Threshold", and "Feret's diameter", where 3 is selected for "Decimal places", "Image"-"Adjust"-"Threshold" is sequentially selected, and 0 and 100 are sequentially set at positions boxed by "Threshold", so that pore data in the electron microscope image of the cross section can be exported by using an Analyze-Measure function. Exporting is performed by using "Image"-"Overlay"-"Flatten", to obtain a pore image; "Apply" in "Threshold" is clicked, then "Analyze"-"Analyze Particles" is clicked, and the left four columns are checked, to obtain pore statistics data.

It may be understood that in this embodiment of the present application, the "pore" in the cross section of the positive electrode film layer is identified by using the image color difference and the threshold. The "pore" is not pore data obtained in the venting test, and is mainly used for representing a cross-sectional area between particles in a cross section of the positive electrode film layer. This method is better than the venting method, because the porosity obtained in the venting method is related to a pore between the particles, and is also related to a pore in the carbon layer with which the surface of the lithium iron phosphate particles is coated. Consequently, the pore between the particles cannot be objectively reflected. A lower porosity in the cross section of the positive electrode film layer obtained by testing in this method indicates, on one hand, better grading of large, medium-sized, and small particles in the positive electrode film layer and a higher compacted density. On the other hand, after same grading and rolling pressure, if the porosity is low, it indicates that the particles easily slip relative to each other, thereby reducing risks of overpressure and stress concentration in the film layer, further reducing a probability of releasing the positive electrode film in a long-cycle process, and facilitating improving long-cycle performance of the battery.

In some implementations, the positive electrode plate includes an undercoating, and the undercoating is arranged between the positive electrode film layer and the current collector; and the undercoating includes carbon-based particles, and a distribution density of the carbon-based particles having particle sizes greater than 100 nm in the undercoating is ≤10 pcs/10 μm.

The carbon-based particle refers to a particle using a carbon element as a main component, and includes, but is not limited to, conductive carbon and carbon black.

The undercoating helps to improve the electric conductivity and the bonding force between the positive electrode film layer and the current collector, reduce the release of the positive electrode film layer from the current collector during a cycle process, and improve the dynamic performance of the battery. In the electrode plate with a high compacted density in this embodiment of the present application, for example, when a compacted density of the positive electrode plate in a fully discharged state is greater than or equal to 2.4 g/cm$^3$, the current collector is prone to be damaged in a high-pressure compaction process of the electrode plate, and large-size particles are prone to generate pits on the current collector. A distribution density of the carbon-based particles whose particle sizes are greater than 100 nm in the undercoating is controlled to be ≤10 pcs/10 μm, which helps reduce a probability that the current collector is damaged in the electrode plate with a high compacted density, and further improve an extreme compacted density of the positive electrode plate.

For the distribution density of the carbon-based particles having particle sizes greater than 100 nm in the undercoating, the foregoing method may be used. The positive electrode film layer is cut by using an argon ion beam in an electrode plate thickness direction, a scanning electron microscope image or a microscope image is captured, the sizes of the carbon particles in the undercoating are detected by using a statistical method, and the quantity of carbon-based particles having particle sizes greater than 100 nm that are included in the undercoating per 10 μm is counted for not less than 5 times, to calculate an average value.

The undercoating in the embodiments of the present application may be implemented by using any well-known preparation process. For example, operations such as sifting or centrifuging are performed in advance in a process of preparing carbon-based particles to remove the large-particle carbon-based material, so that $D_{V50}$ of the carbon-based particles added in the process of preparing the undercoating ranges from 20 to 60 nm, and $D_{V90}$ is less than or equal to 70 nm. The carbon-based material and the binder are mixed, stirred, and applied to the current collectors to obtain the undercoating.

In some implementations, a compacted density of the positive electrode plate in the fully discharged state is greater than or equal to 2.4 g/cm$^3$, and a single-sided thickness of the undercoating ranges from 1 μm to 4 μm.

In some implementations, a compacted density of the positive electrode plate in the fully discharged state is greater than or equal to 2.5 g/cm$^3$, and a single-sided thickness of the undercoating ranges from 2 μm to 4 μm.

With an increase in the compacted density of the electrode plate, a pressing effect of the large-particle lithium-containing phosphate material (for example, having a particle size greater than 1 μm) in the positive electrode film layer on the undercoating is more prominent. Therefore, stress concentration is prone to occur at sites of the large particles, and even the large particles pass through the undercoating to damage the current collector. Increasing the thickness of the undercoating helps to alleviate a stress concentration phenomenon in the electrode plate, and further increases the extreme compacted density of the electrode plate.

The single-sided thickness of the undercoating may be tested in the following manner. According to the foregoing method, the positive electrode film layer is cut by using an argon ion beam in the electrode plate thickness direction, a scanning electron microscope image is captured, and in the electrode plate length direction, points are taken at intervals of 1 μm to measure the single-sided thickness of the undercoating. After thicknesses of the undercoating at 10 points are measured, an average value is calculated. It should be noted that abnormal points, that is, an undercoating region having a thickness less than 50 nm and a thickness greater than 4 μm need to be avoided in a measurement and point taking process; and these abnormal points are caused mainly due to extreme fluctuation in the thicknesses of several regions caused by abnormal stress concentration and compression in a compaction process of the electrode plate, and do not have statistical significance.

In some implementations, the thickness of the positive electrode current collector is less than or equal to 17 μm, and optionally ranges from 13 μm to 15 μm.

In some implementations, the thickness of the positive electrode current collector is 13 μm, 14 μm, 15 μm, 16 μm, or 17 μm, or in a value range between any two thereof.

In some implementations, the positive electrode current collector may be a metal foil or a composite current collector. For example, as the metal foil, an aluminum foil may be used. The composite current collector may include a polymer material undercoating or a metal layer located on at least one surface of the polymer material undercoating. The composite current collector may be formed by forming a metal material (aluminum, an aluminum alloy, nickel, a nickel alloy, titanium, a titanium alloy, silver, a silver alloy, or the like) on the polymer material substrate (for example, a substrate of polypropylene (PP), polyethylene terephthalate (PET), polybutylene terephthalate (PBT), polystyrene (PS), or polyethylene (PE)).

In some implementations, the negative electrode plate includes a negative electrode current collector and a negative electrode film layer arranged on at least one side of the negative electrode current collector, and a single-sided surface density of the negative electrode film layer ranges from 140 mg/1540 $mm^2$ to 215 mg/1540 $mm^2$; and/or a compacted density of the negative electrode film layer ranges from 1.40 $g/cm^3$ to 1.75 $g/cm^3$.

The single-sided surface density and the compacted density of the negative electrode film layer may be tested by using methods similar to those for the positive electrode film layer described above.

The surface density and the compacted density of the negative electrode film layer being within the foregoing ranges helps improve the energy density of the lithium-ion secondary battery.

In some implementations, the negative electrode current collector may be a metal foil or a composite current collector. For example, as the metal foil, a copper foil may be used. The composite current collector may include a polymer material undercoating and a metal layer formed on at least one surface of a polymer material substrate. The composite current collector may be formed by forming a metal material (copper, copper alloy, nickel, nickel alloy, titanium, titanium alloy, silver, silver alloy, or the like) on the polymer material substrate (for example, a substrate of polypropylene (PP), polyethylene terephthalate (PET), polybutylene terephthalate (PBT), polystyrene (PS), or polyethylene (PE)).

In some implementations, the negative electrode film layer includes a negative electrode active material, the negative electrode active material may be a negative electrode active material used for a battery and well known in the art. For example, the negative electrode active material may include at least one of the following materials: artificial graphite, natural graphite, soft carbon, hard carbon, a silicon-based material, a tin-based material, lithium titanate, and the like. The silicon-based material may be selected from at least one of elemental silicon, a silicon oxide, a silicon-carbon composite, a silicon-nitrogen composite, and a silicon alloy. The tin-based material may be selected from at least one of elemental tin, a tin oxide, and a tin alloy. However, the present application is not limited to such materials, and may alternatively use other conventional materials that can be used as negative electrode active materials for batteries. These negative electrode active materials may be used alone or in combination with two or more.

In some implementations, the negative electrode film layer optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some implementations, the negative electrode film layer optionally includes a conductive agent. The conductive agent may be selected from at least one of superconducting carbon, acetylene black, carbon black, Ketjen black, carbon dots, carbon nanotubes, graphene, and carbon nanofibers.

In some implementations, the negative electrode film layer optionally includes another adjuvant such as a thickener (for example, sodium carboxymethyl cellulose (CMC-Na)).

In some implementations, the negative electrode plate may be prepared in the following manner: dispersing the foregoing components for preparing the negative electrode plate, for example, the negative electrode active material, the conductive agent, the binder, and any other components, in a solvent (for example deionized water) to form a negative electrode slurry; and coating the negative electrode slurry on the negative electrode current collector, followed by processes such as drying and compacting, to obtain the negative electrode plate.

In some implementations, the lithium-ion secondary battery includes an electrolyte. An electrolyte achieves an ion conducting effect between the positive electrode plate and the negative electrode plate. A type of the electrolyte is not specifically limited in the present application, and may be selected based on a requirement. For example, the electrolyte can be liquid, gelled, or all solid.

In some implementations, the electrolyte is an electrolytic solution. The electrolytic solution includes an electrolyte salt and a solvent.

In some implementations, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium triflate, lithium difluorophosphate, lithium difluoro(oxalato)borate, lithium bis(oxalate)borate, lithium difluorobis(oxalato) phosphate, and lithium tetrafluoro(oxalato)phosphate.

In some implementations, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfoxide, and diethyl sulfone.

In some implementations, the electrolytic solution may optionally include additives. For example, the additive may include a negative electrode film forming additive, a positive electrode film forming additive, and may further include an additive that can improve particular battery performance, for example, an additive that improves battery overcharging performance, or an additive that improves high-temperature or low-temperature performance of the battery.

In some implementations, the lithium-ion secondary battery further includes a separator. The type of the separator is not specifically limited in the present application, and any well-known separator with a porous structure having good chemical stability and mechanical stability may be selected.

In some implementations, a material of the separator may be selected from at least one of glass fiber, non-woven fabric, polyethylene, polypropylene, and polyvinylidene fluoride. The separator can be either a single-layer thin film or a multi-layer composite thin film without special limitations. When the separator is a multi-layer composite thin film, the materials of the layers can be the same or different without special limitations.

In some implementations, an electrode assembly may be manufactured by a positive electrode plate, a negative electrode plate, and a separator by a winding process or a laminating process.

In some implementations, the lithium-ion secondary battery may include an outer package. The outer package can be used to encapsulate the above electrode assembly and electrolyte.

In some implementations, the outer package of the lithium-ion secondary battery may be a hard housing, for example, a hard plastic housing, an aluminum housing, or a steel housing. The outer package of the secondary battery may also be a soft package, for example, a pouch-type soft package. A material of the soft package may be plastic, and examples of the plastic may include polypropylene, polybutylene terephthalate, and polybutylene succinate.

A second aspect of the present application provides a battery apparatus, including the lithium-ion secondary battery according to the first aspect of the present application, where the battery apparatus includes at least one of a battery module, a battery pack, and an energy storage battery.

A third aspect of the present application provides an electrical apparatus, including the lithium-ion secondary battery in the first aspect of the present application.

A fourth aspect of the present application provides a preparation method for a positive electrode active material, which includes: obtaining a mixed raw material including a carbon source, a lithium source, an iron source, and a phosphorus source; adding a solvent and performing grinding to obtain a mixed slurry; drying the mixed slurry to obtain a precursor powder; and sintering the precursor powder to obtain a positive electrode active material, where the sintering the precursor powder to obtain a positive electrode active material at least two times of sintering: performing a first time of sintering to obtain a first sintered product, mixing the first sintered product and the carbon source to obtain an intermediate raw material, dividing the intermediate raw material into two groups, separately performing grinding on the two groups to obtain a first group of ground products and a second group of ground products, and mixing the first group of ground products with the second group of ground products to obtain a mixed intermediate product; and performing a second time of sintering on the mixed intermediate product, to obtain a positive electrode active material, where $D_{V50}$ of the first group of ground products ranges from 0.8 μm to 1.2 μm; and $D_{V50}$ of the second group of ground products ranges from 0.30 μm to 0.50 μm.

According to the preparation method, the content and the size of the large particles in the positive electrode active material can be effectively controlled by using a process manner including both two times of sintering and two times of grinding, so that the positive electrode active material not only has a particular content of large particles, but also does not cause the particle size of the large particles to be excessively large. A material basis is provided for preparing the positive electrode film layer whose $D_{A90}$ ranges from 1400 nm to 2100 nm and whose particle size concentration ratio $(D_{A90}-D_{A10})/D_{A50}$ ranges from 1.855 to 2.375.

In some implementations, the iron source is an iron-containing compound. In some implementations, the iron source includes at least one of iron hydroxide, iron dichloride, ferric oxide, iron phosphate, ferric pyrophosphate, ferrous oxalate, iron powder, ferric nitrate, ferrosoferric oxide, and iron oxide-hydroxide.

In some implementations, the phosphorus source is a phosphate compound. In some implementations, the phosphorus source includes at least one of phosphoric acid, iron phosphate, ammonium dihydrogen phosphate, and diammonium hydrogen phosphate.

In some implementations, the iron source and the phosphorous source may be a same material. In some implementations, iron phosphate is used as the iron source and the phosphorous source.

In some implementations, the lithium source includes one or more of lithium carbonate, lithium dihydrogen phosphate, lithium oxalate, lithium oxide, lithium hydroxide, and lithium acetate.

In some implementations, the lithium source includes lithium carbonate.

In some implementations, the carbon source includes one or more of glucose, polyethylene glycol, citric acid, sucrose, starch, fructose, lactose, polyaniline, polyacrylonitrile, and polyvinylpyrrolidone.

In some implementations, the carbon source includes glucose and polyethylene glycol.

In some implementations, a mass content of polyethylene glycol based on a total mass of the carbon source ranges from 20% to 75%.

The polymer carbon source has a relatively low graphitization temperature, so that the carbon coated material on the surface of the positive electrode active material can decompose to form a carbon layer at a relatively low sintering temperature, thereby hindering growth and sintering growth of the lithium-containing transition metal phosphate, and helping reduce the particle sizes of the positive electrode active material particles.

In addition, the polymer carbon source usually has a relatively high molecular weight or a relatively long molecular chain, and easily forms a stable skeleton structure through cross-linking or orientation in a heat treatment process. This orderliness is retained in a high-temperature carbonization process, facilitating directional growth of the graphitic crystal. In addition, entangling and cross-linking between the long chains help reduce structural defects and reduce lattice disorder caused by chain breaking in the carbonization process, thereby improving the graphitization degree.

Under a high temperature, an organic molecule in the carbon source decomposes, to release carbon atoms, and the carbon atoms may cover and fill tiny gaps or defects on the surface of the active material, thereby reducing the surface roughness. A coated material formed by a saccharide carbon source has a relatively low graphitization degree, the flocculent carbon structure is relatively loose and may be used as a new rough point. Therefore, a higher proportion of the polymer carbon source in the carbon source is more beneficial to optimization of the surface roughness of the positive electrode active material.

In some implementations, the slurry further includes a titanium source. Optionally, the titanium source includes one or more of titanium dioxide, tetrabutyl titanate, titanium nitrate, and titanic acid.

The titanium source usually has a relatively low surface activity. The slurry including the titanium source can reduce the activity of the lithium-containing transition metal phosphate precursor and suppress particle growth of the lithium-containing transition metal phosphate in a high-temperature sintering process, so that relatively small particles are formed in the lithium-containing transition metal phosphate in the sintering process.

Titanium is used as a lattice stabilizer. The titanium element usually enters, in a form of $Ti^{4+}$, a lattice of the lithium-containing transition metal phosphate. Some titanium ions may replace iron ions, so that the crystal structure is more stable, thereby reducing the possibility that antisite occurs between lithium and iron ions, especially at a high temperature or during charge and discharge at a large current.

In addition, doping of titanium helps to improve the sphericity of the particles and reduce the roughness of the particles, thereby enhancing the overall structural stability of the material.

In some implementations, an atomic molar ratio of the iron element to the phosphorous element in the iron source and the phosphorous source ranges from 0.95 to 1.

In some implementations, an atomic molar ratio of the iron element to the phosphorous element in the iron source and the phosphorous source is optionally 0.95, 0.955, 0.96, 0.965, 0.97, 0.975, 0.98, 0.985, 0.99, 0.995, or 1, or in a value range between any two thereof.

When the lithium-containing transition metal oxide is synthesized, the ratio of iron to phosphorous affects a reaction rate and a crystal growth process. A low ratio of iron to phosphorous can improve a reaction rate of the iron source, and accelerate conversion of the iron source into the lithium-containing transition metal phosphate. A high phosphorous content can suppress interaction between iron and carbon, reduce formation of an iron-based compound such as $Fe_3C$, and facilitate graphitization of the carbon layer. After the step becomes a rate determining step, a crystal growth time is prolonged, thereby promoting the formation of relatively large particles. In this way, the particle size distribution and the area distribution of the particles are adjusted to obtain a required packing structure.

In some implementations, a mass proportion of the carbon source in the mixed raw material based on a total mass of the mixed raw material ranges from 5% to 7%.

In some implementations, a mass proportion of the carbon source in the mixed raw material based on a total mass of the mixed raw material is optionally 5%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, or 7%, or in a value range between any two thereof.

By controlling the mass proportion of the carbon source to be in the foregoing range, the conductivity of the material can be enhanced, and negative impact on the specific capacity of the positive electrode plate and the energy density of the battery can be reduced. An excessively thick carbon layer not only occupies effective space of the active material, but also may make the structure of the material unstable.

In some implementations, the solvent includes water and a mixture thereof.

In some implementations, the obtaining a mixed raw material including a carbon source, a lithium source, an iron source, and a phosphorus source includes: adding the carbon source, the lithium source, the phosphorus source, the iron source, and the carbon source to a solvent, mixing, and stirring, where a rotation speed of the stirring ranges from 1400 rpm to 2200 rpm.

In some implementations, the performing grinding to obtain a mixed slurry includes first time of grinding, and the first time of grinding satisfies one or more of the following conditions:

(1) a grinding ball of the first time of grinding is one or more of a zirconium oxide ball, a zirconium silicon nitride ball, and a ceramic zirconium ball;

(2) a diameter of the grinding ball of the first time of grinding ranges from 0.5 mm to 0.7 mm;

(3) a rotation speed of the first time of grinding ranges from 450 rpm to 550 rpm;

(4) a time of the first time of grinding ranges from 0.5 h to 1.5 h; and (5) a grinding cavity pressure of the first time of grinding ranges from 0.01 MPa to 0.3 MPa.

In some implementations, the performing grinding to obtain a mixed slurry includes performing second time of grinding after the first time of grinding, and the second time of grinding satisfies one or more of the following conditions:

(1) a grinding ball of the second time of grinding is one or more of a zirconium oxide ball, a zirconium silicon nitride ball, and a ceramic zirconium ball;

(2) a diameter of the grinding ball of the second time of grinding ranges from 0.25 mm to 0.35 mm;

(3) a rotation speed of the second time of grinding ranges from 470 rpm to 530 rpm;

(4) a time of the second time of grinding ranges from 3.0 h to 5.0 h; and (5) a grinding cavity pressure of the second time of grinding ranges from 0.01 MPa to 0.3 MPa.

In some implementations, a particle size $D_{V50}$ of the mixed slurry ranges from 0.3 μm to 0.5 μm.

At least two times of grinding are beneficial to controlling the temperature and the viscosity of the slurry, so as to reduce excessive stickiness of the slurry caused by an excessively high temperature and consequent agglomeration of the raw material, uniformity of particle sizes of particles in a product is improved, and generation of excessively large particles is reduced, thereby facilitating control $D_{A90}$ of the particles in the positive electrode film layer.

The first time of grinding can treat a large-particle material, and the second time of grinding further refines the material and adjusts the particle size distribution. In this way, particle size unevenness caused during a grinding process can be effectively reduced, inter-particle agglomeration can be reduced, and the conductivity and the cycle stability of the battery can be improved. In addition, the overall production efficiency can be improved while the performance of a final product can be satisfied.

In some implementations, the drying the mixed slurry to obtain a precursor powder includes spray-drying the mixed slurry to obtain a precursor powder.

In some implementations, the first time of sintering of the at least two times of sintering satisfies one or more of the following conditions:

(1) a heating rate ranges from 2° C./min to 10° C./min;

(2) a holding temperature ranges from 720° C. to 790° C.; and (3) a holding time ranges from 5 h to 12 h.

In some implementations, the carbon source added to the intermediate raw material obtained by mixing the first sintered product and the carbon source includes glucose and polyethylene glycol.

In some implementations, based on a mass of the first sintered product, a mass content of the glucose in the intermediate raw material ranges from 1% to 3%, and a mass content of the polyethylene glycol in the intermediate raw material ranges from 0.5% to 6%.

In some implementations, $D_{V50}$ of the first group of ground products ranges from 0.8 μm to 1.2 μm.

In some implementations, $D_{V50}$ of the second group of ground products ranges from 0.30 μm to 0.50 μm.

Compared with a large particle, surface atoms of a small particle occupy a relatively large proportion, have a relatively large surface energy, and have relatively high activity and a larger surface area per unit volume. Therefore, a rate of surface diffusion is relatively high. In this way, the small particle is prone to relatively violent surface rearrangement during a sintering process, thereby pushing the particle to evolve toward a spherical form. Therefore, controlling the grinding particle size to be a relatively small value, which includes grinding for obtaining the mixed slurry and grinding for obtaining the intermediate raw material, helps the particles to form a product having higher sphericity and a smoother and flatter surface in a subsequent sintering process. In addition, particles having a relatively small grinding particle size are more easily encapsulated, thereby improving encapsulation integrity.

In some implementations, a grinding condition of the first group of ground products satisfies one or more of the following conditions:

(1) the rotation speed is 550 rpm±50 rpm; and (2) the grinding time ranges from 0.5 h to 1.5 h.

In some implementations, a grinding condition of the second group of ground products satisfies one or more of the following conditions:

(1) the rotation speed is 500 rpm±50 rpm; and (2) the grinding time ranges from 3 h to 5 h.

In some implementations, a mass ratio of the first group of ground products to the second group of ground products ranges from (60:40) to (80:20).

By adjusting the mass ratio of the first group of ground products to the second group of ground products, positive electrode active materials of different grading ratios can be obtained, so that an area ratio of particles of particle sizes can be finely adjusted to obtain a required packing structure.

In some implementations, the second time of sintering satisfies one or more of the following conditions:

(1) a holding temperature ranges from 770° C. to 830° C.;

(2) a holding time ranges from 5 h to 12 h; and (3) a heating rate ranges from 2° C./min to 10° C./min.

The second time of sintering process can effectively shorten a sintering time at a high-temperature interval, thereby reducing a risk and a probability that extremely large particles appear during high-temperature sintering. Activity of the particles can be controlled by adjusting the particle sizes of the two groups of grinding during the second time of sintering, so that the positive electrode active material also has large particles with a particular area percentage, to enable the battery cell to have good dynamic performance while improving the compacted density of the electrode plate and improving the energy density of the battery cell.

By controlling sintering temperatures in the first time of sintering process and the second time of sintering process, a sintering diffusion rate may be controlled. At a high temperature, diffusion on the surface of the particle increases, defects in the particle are repaired, and the lattice is rearranged. By recrystallization, defects on the surfaces of the particles are eliminated, the grain structures of the particles are more orderly, and the sizes of the particles gradually increase. In addition, smoothing of the surfaces of the particles is facilitated and the particles are encouraged to develop toward a spherical form. The sintering temperature also affects a graphitization rate of the carbon source. In terms of dynamics, the carbon atoms acquire more energy, and can overcome an original energy barrier, so that the carbon atoms rearrange more intensely in a lattice. However, the sintering time affects a degree to which a reaction proceeds. If the sintering time is excessively short, neither diffusion nor rearrangement of the lithium-containing transition metal phosphate and the carbon source is completely completed. If the sintering time is excessively long, the particles abnormally grow, grains in the particles are coarsened, the material structure tends to be unstable, the bonding force between the particles is enhanced, and agglomeration occurs.

In some implementations, jet milling is performed on the product after the precursor is sintered, to obtain the positive electrode active material.

In some implementations, a grading frequency of the jet milling ranges from 20 Hz to 30 Hz, and a milling air pressure ranges from 0.45 MPa to 0.55 MPa.

The grading frequency in the jet milling refers to a working frequency of a grading apparatus in the jet milling, and is usually related to grading efficiency and particle size distribution of particles. A higher grading frequency screens particles in an air flow for more times, so that large particles are screened out, and small particles are left. In addition, a relatively high grading frequency may increase the quantity of times of particle collision, so that an irregular particle is further impacted. Therefore, the surface of the particle becomes smoother and the shape of the particle tends to be spherical.

A high air pressure causes the particles to encounter a larger impact force, and collision between the particles is more severe, which causes relatively strong impact and wear on the surfaces of the particles. Large particles can be crushed into small particles, collision between the particles is more severe, and the surfaces are more easily trimmed, thereby improving the sphericity and the surface flatness of the particles.

However, an excessively high grading frequency and milling air pressure cause the agglomerated particles to be dispersed into primary particles and then further cracked and crushed, a predetermined particle grading distribution is affected, and the carbon coated material structure is incomplete, which is manifested by an increase in iron dissolution, negatively affecting slippage of the particles during rolling, and increasing contact and reaction between the lithium-containing transition metal phosphate and external factors such as an electrolytic solution, which is not beneficial to maintenance of the cycle performance and the life of the battery. Therefore, the grading frequency of the jet milling and the milling air pressure need to be controlled to be within proper intervals.

A fifth aspect of the present application provides a preparation method for a positive electrode plate. The preparation method including: sequentially adding a binder, a conductive agent, and the positive electrode active material that is prepared in the method according to the fourth aspect, dry mixing, adding a solvent, stirring, and adjusting a viscosity, to obtain a delivery slurry; and transfer-coating at least one side of a current collector with the delivery slurry, drying, and hot pressing, to obtain a positive electrode film layer.

In some implementations, the drying is at a temperature ranging from 95° C. to 105° C. and a speed ranging from 2.0 m/min to 2.3 m/min.

In some implementations, the hot pressing includes at least three times of hot rolling, hot rolling pressures are sequentially increased, and the hot rolling pressures sequentially range from 20 metric tons to 50 metric tons, 50 metric tons to 70 metric tons, and 70 metric tons to 90 metric tons; a hot rolling temperature ranges from 40° C. to 80° C.; and before entering hot rolling for a first time for compaction, the electrode plate is heated, and a heating temperature ranges from 40° C. to 50° C.

In this embodiment of the present application, the positive electrode active material that is prepared by using the foregoing hot pressing process in combination with the preparation method of the fourth aspect is beneficial to further reducing the porosity of the cross section of the positive electrode film layer, increasing the extreme compacted density of the electrode plate, and improving the energy density of the battery.

In some implementations, the stirring, and adjusting a viscosity, to obtain a delivery slurry specifically includes performing pre-stirring, to obtain a first slurry; re-stirring the first slurry to obtain a second slurry; and slowly stirring the second slurry, and adjusting a viscosity, to obtain a delivery slurry.

In addition, the present application further provides an electrical apparatus, where the electrical apparatus includes at least one of the secondary battery, the battery module, or the battery pack provided in the present application. The secondary battery, battery module, or battery pack can be used as a power source for the electrical apparatus, and can also be used as an energy storage unit for the electrical apparatus. The electrical apparatus may include a mobile device (for example, a mobile phone or a notebook computer), an electric vehicle (for example, a pure electric vehicle, a hybrid electric vehicle, a plug-in hybrid electric vehicle, an electric bicycle, an electric scooter, an electric golf cart, or an electric truck), an electric train, a ship, a satellite, an energy storage system, or the like, but is not limited thereto.

For the electrical apparatus, the secondary battery, the battery module, or the battery pack can be selected according to the requirements during use.

Figure 7:
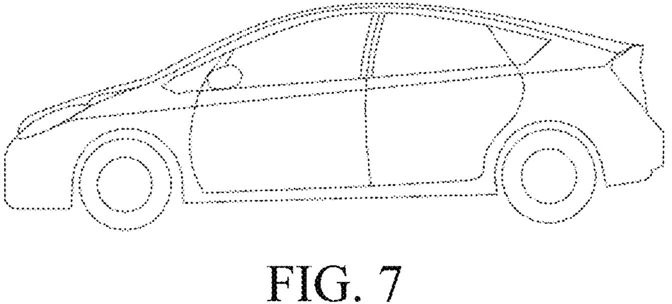
FIG. 7 is a schematic diagram of an electrical apparatus using a lithium-ion secondary battery according to an implementation of the present application as a power supply.
Figure 8:
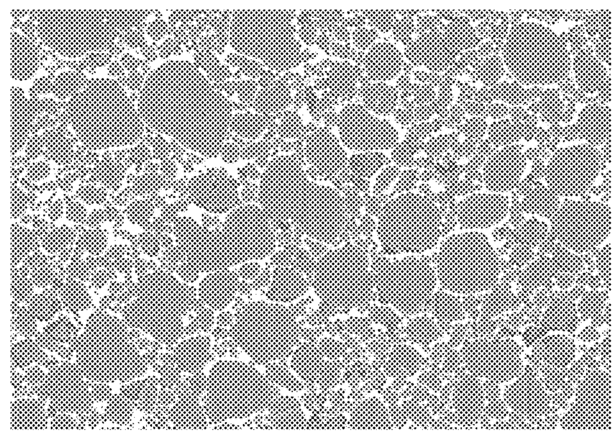
FIG. 8 is a testing diagram of a porosity of a cross section of a positive electrode film layer in a thickness direction according to an implementation of the present application.

FIG. 7 is an electrical apparatus as an example. The electrical apparatus is an all-electric vehicle, a hybrid electric vehicle, a plug-in hybrid electric vehicle, or the like. To satisfy the need of the electrical apparatus for a high power and high energy density of secondary batteries, a battery pack or a battery module can be used.

The apparatus as another example may be a mobile phone, a tablet computer, a laptop, and the like. The electrical apparatus is generally required to be light and thin, and may use a secondary battery as a power source.

EXAMPLES

The examples of the present application are described below. The examples described below are illustrative, are merely used to explain the present disclosure, and should not be construed as a limitation to the present disclosure. Where no specific technologies or conditions are indicated in the embodiments, the technologies or conditions described in the literatures in the art or the instructions for the product are followed. The reagents or instruments without manufacturer indicated are all conventional products that may be purchased in the market.

Example 1

(1) Preparation of a Positive Electrode Active Material

S1: Add lithium carbonate, iron phosphate, glucose, and titanium dioxide to water, mix them in a premix tank at a rotation speed of 1800 μm, and perform demagnetization by using a demagnetizing bar having a magnetic field intensity ranging from 8000 to 12000 Gs, where a ratio of the lithium carbonate to the iron phosphate causes a molar ratio of iron to phosphorous to be 0.975, a mass content of glucose relative to a total mass of the iron phosphate is 5.7%, and a doped amount of the titanium dioxide causes a mass content of titanium with which the carbon coated lithium iron phosphate positive electrode active material product is doped to be 5000 ppm.

S2: Perform a cycle of two times of grinding-demagnetization on the mixed raw material in a sand mill, perform a first time of grinding under conditions of using a zirconium oxide ball with a diameter of 0.6 mm and a rotation speed of 500 rpm, where a grinding time length is 1 h, and a grinding cavity pressure is less than 0.3 MPa, and demagnetize the raw material subject to the first time of grinding by using a permanent magnetic iron remover, where a demagnetization intensity is greater than or equal to 8000 Gs; and perform a second time of grinding on the demagnetized raw material, to obtain a mixed slurry, where a particle size $D_{V50}$ of the mixed slurry is 0.40 μm±0.10 μm.

S3: Spray-dry the mixed slurry to obtain precursor powder.

S4: Sinter the precursor powder to obtain a lithium iron phosphate positive electrode active material, where a process of the sintering includes:

- first time of sintering: sintering the precursor powder in a nitrogen gas atmosphere, increasing the temperature from 25° C. to 760° C. at a temperature increasing rate of 5° C./min, and holding the temperature for 10 h, to obtain a first sintered product after cooling;
- grinding and mixing: adding 1.5% of glucose based on the total mass of the first sintered product and 3.0% of polyethylene glycol based on the total mass of the first sintered product to the first sintered product; performing grinding (a third time of grinding) in two groups, where when the $D_{V50}$ of the particles in the first group reaches 1.0 μm±0.20 μm, the abrading is stopped (the abrading condition is 550 rpm±50 rpm, and the abrading time is 1 h), to obtain a first group of ground products, and when the $D_{V50}$ of the particles in the second group reaches 0.38 μm±0.05 μm, the abrading is stopped (the abrading condition is 500 rpm±50 rpm, and the abrading time is 4 h), to obtain a second group of ground products; mixing the first group of ground products and the second group of ground products according to a mass ratio of 70:30, to obtain a mixed intermediate product; and spray-drying the mixed intermediate product; and second time of sintering: sintering the dried mixed intermediate product in a nitrogen gas atmosphere, increasing the temperature from 25° C. to 800° C. at a temperature increasing rate of 5° C./min, and holding the temperature for 10 h, to obtain a second sintered product after cooling.

S5: Cool to a temperature below 100° C. after the sintering is completed, and crush the second sintered product by using a method of jet milling, to obtain a carbon coated lithium iron phosphate positive electrode active material, where a grading frequency of the jet milling is 25 Hz, and a milling air pressure is 0.55 MPa.

In the prepared positive electrode active material, the mass content of the carbon element is 1.248%, the lithium-iron antisite defect concentration is 0.22%, the powder tapped density is 1.30 g/cm$^3$, the powder compacted density under a pressure of 3T is 2.62 g/cm$^3$, and the powder resistivity under a pressure of 8 MPa is 10.95 (2·cm; a discharge gram capacity at a discharge rate of 1 C is 140.8 mAh/g; and the discharge capacity ratio of the 3.2 V discharging platform is 90.0%.

(2) Preparation of a Positive Electrode Plate:

Sequentially add 2.2 wt % of PVDF, 0.8 wt % of the conductive carbon black, and 97.0 wt % of the positive electrode active material, dry mix, add the mixture to N-methylpyrrolidone, stir, and adjust a viscosity, to obtain a delivery slurry; and transfer-coat an undercoating of a current collector aluminum foil with the delivery slurry, where the undercoating includes carbon black and PVDF, whose mass ratio is 1:1, a distribution density of the carbon-based particles in the undercoating having particle sizes greater than 100 nm in the undercoating is ≤10 pcs/10 μm, and the undercoating had a thickness of 2 μm. After drying and hot pressing, a positive electrode film layer having a single-sided surface density of 350 mg/1540 cm$^2$ is obtained. The drying is at a temperature of 95° C. and a speed of 2.0 m/min.

The hot pressing process includes a process of three times of hot rolling, hot rolling pressures are sequentially increased, and the hot rolling pressures are sequentially 35 metric tons, 55 metric tons, and 75 metric tons; a hot rolling temperature is 65° C.; and before entering hot rolling for a first time for compaction, the electrode plate is heated, and a heating temperature is 50° C.

The compacted density of the electrode plate is the extreme compacted density of the electrode plate, and reference may be made to the following description for the method for testing the extreme compacted density of the electrode plate; and the extreme compacted density of the electrode plate in this embodiment is 2.71 g/cm$^3$.

14827 particles are obtained through statistics collection from a cross section of the positive electrode film layer in an electrode plate thickness direction. The result indicates that for the particles in the cross section of the positive electrode film layer, $D_{A50}$ is 719 nm, $D_{A10}$ is 214 nm, $D_{A90}$ is 1674 nm, and a particle size concentration ratio $(D_{A90}-D_{A10})/D_{A50}$ is 2.031.

For the prepared positive electrode film layer, a graphitization degree median $C_{50}$ obtained in a laser micro-confocal Raman spectrometer surface scanning mode is 1.04. In the sphericity area cumulative distribution curve of the particles that are obtained from the cross section of the positive electrode film layer in the electrode plate thickness direction, the sphericity median $L_{A50}$ is 0.725. In a roughness area cumulative distribution curve of the particles that are obtained from the cross section of the positive electrode film layer in the electrode plate thickness direction, a roughness median $R_{A50}$ is 0.952, and a roughness concentration ratio is 0.08. An iron dissolution rate of the positive electrode film layer is 860.7 ppm.

(3) Preparation of a Negative Electrode Plate:

A negative electrode active material (artificial graphite) of 95.5 wt %, a conductive agent (conductive carbon black) of 1.0 wt %, a binder (styrene-butadiene rubber (SBR)) of 2.0 wt %, and a thickener (sodium carboxymethyl cellulose (CMC)) of 1.5 wt % were mixed, deionized water was added, and stirring was performed, to prepare a negative electrode slurry through dispersion. Then, the negative electrode slurry was coated on two side surfaces of a Cu foil. After the negative electrode slurry was coated on both surfaces, drying, compacting, dividing, and plate production were performed, to prepare the negative electrode plate. The coating has a single-sided surface density of 166 mg/1540.25 mm$^2$ and a compacted density of 1.60 g/cm$^3$.

(4) Preparation of a Separator

A polypropylene film is used as the separator.

(5) Preparation of an Electrolytic Solution

In a glove box (where $H_2O$<0.1 ppm, and $O_2$<0.1 ppm) in an atmosphere of argon gas, organic solvents ethylene carbonate (EC)/dimethyl carbonate (DMC) were uniformly mixed according to a volume ratio of 1/1, lithium salt $LiPF_6$ was added and dissolved in the organic solvents, where a content of $LiPF_6$ in the solution was 1 mol/L, and stirring was uniformly performed, to obtain the electrolytic solution.

(6) Preparation of a Battery:

The positive electrode plate, the separator, and the negative electrode plate were laminated in sequence. The separator needs to have a function of separating positive and negative electrodes. A bare cell was obtained through rolling. The bare cell was placed in an outer package, an electrolytic solution was injected, and the lithium-ion battery was finally obtained through processes such as encapsulation, formation, and evacuation.

A preparation method in Example 2 was basically the same as that in Example 1, and a difference lies in that in step S4, when the $D_{V50}$ of the particles in the first group reached 0.80 μm±0.20 μm, the grinding was stopped, and when the $D_{V50}$ of the particles in the second group reached 0.30 μm±0.05 μm, the grinding was stopped.

A preparation method in Example 3 was basically the same as that in Example 1, and a difference lies in that in step S4, when the $D_{V50}$ of the particles in the first group reached 0.80 μm±0.20 μm, the grinding was stopped, and when the $D_{V50}$ of the particles in the second group reached 0.45 μm±0.05 μm, the grinding was stopped.

A preparation method in Example 4 was basically the same as that in Example 1, and a difference lies in that in step S4, when the $D_{V50}$ of the particles in the first group reached 0.80 μm±0.20 μm, the grinding was stopped, and when the $D_{V50}$ of the particles in the second group reached 0.45 μm±0.05 μm, the grinding was stopped; and the first group of ground products to the second group of ground products are mixed in a mass ratio of 60:40.

A preparation method in Example 5 was basically the same as that in Example 1, and a difference lies in that in step S4, when the $D_{V50}$ of the particles in the first group reached 1.20 μm±0.20 μm, the grinding was stopped, and when the $D_{V50}$ of the particles in the second group reached 0.45

μm±0.05 μm, the grinding was stopped; and the first group of ground products to the second group of ground products are mixed in a mass ratio of 80:20.

A preparation method in Example 6 was basically the same as that in Example 1, and a difference lies in that in step S4, when the $D_{V50}$ of the particles in the first group reached 1.20 μm±0.20 μm, the grinding was stopped, and when the $D_{V50}$ of the particles in the second group reached 0.30 μm±0.05 μm, the grinding was stopped.

A preparation method in Comparative Example 1 was basically the same as that in Example 1, and a difference lies in that in step S4, when the $D_{V50}$ of the particles in the first group reached 0.75 μm±0.20 μm, the grinding was stopped, and when the $D_{V50}$ of the particles in the second group reached 0.50 μm±0.05 μm, the grinding was stopped.

A preparation method in Comparative Example 2 was basically the same as that in Example 1, and a difference lies in that in step S4, when the $D_{V50}$ of the particles in the first group reached 1.50 μm±0.20 μm, the grinding was stopped, and when the $D_{V50}$ of the particles in the second group reached 0.38 μm±0.05 μm, the grinding was stopped.

A preparation method in Comparative Example 3 was basically the same as that in Example 1, and a difference lies in that in step S2, a particle size $D_{V50}$ of the mixed slurry is 0.35 μm±0.10 μm; and in step S4, there is only the first time of sintering, and the sintering process includes: sintering the precursor powder in a nitrogen gas atmosphere, increasing the temperature from 25° C. to 800° C. at a temperature increasing rate of 5° C./min, and holding the temperature for 10 h, to obtain a sintered product after cooling.

Performance Test

1. Extreme Compacted Density of an Electrode Plate

The double-side coated electrode plate is compacted by using a roller mill, the elongation rate of the compacted electrode plate is tested, and the flexibility of the compacted electrode plate is evaluated. By increasing the pressure of the roller mill, an electrode plate with a different compacted density is obtained. As the pressure increases, the compacted density of the electrode plate increases, the elongation rate of the electrode plate increases, and the flexibility of the electrode plate decreases. Excessively high elongation rate of the electrode plate easily causes warpage of the electrode plate, and excessively low flexibility of the electrode plate easily causes embrittlement fracture of the electrode plate. Therefore, the extreme compacted density of the electrode plate is defined as a smaller value between the compaction densities corresponding to an elongation rate of 8% of the electrode plate and the compacted density corresponding to a flexibility folding count of 3 times of the electrode plate.

The compacted density is calculated by using a mass of the positive electrode film layer/a volume of the positive electrode film layer.

A test method for an elongation rate is as follows:

An electrode plate is tiled on a horizontal desktop, and the electrode plate is segmented and cut, where the length of each strip of electrode plate is approximately 100 cm; the base material copper foil at the edge of the electrode plate is removed, care is taken to keep the cut edge of the electrode plate parallel to the MD direction (perpendicular to the direction of the pressing roller) of the electrode plate, to ensure that a part of the electrode plate is completely covered by the coating, a length between marked points of a head and a tail of the electrode plate at same width positions in the length direction is measured by using a steel ruler, and the length is estimated to be 0.1 mm, and the length before compaction is recorded; and after the compaction, a length between the corresponding marked points after the compaction is recorded, and (the length after the compaction—the length before the compaction)/the length before the compaction is used as an elongation rate of the electrode plate.

A test method of a flexibility folding count is as follows:

A positive electrode plate is cut into a test sample having a size of 20×100 mm$^2$; after the test sample is folded in a forward direction, the folded test sample is flattened by using a 2 kg pressing roller, and is unfolded to check whether light transmission occurs in a gap against light; if no light transmission occurs, the test sample is folded in a reverse direction, is flattened by using the 2 kg pressing roller, and is checked against light again; this is repeated until light transmission occurs in a gap, and the folding count is recorded; and the test is repeated for three times, and an average value is taken as reference data of the flexibility of the electrode plate.

2. Energy Density Test

The lithium-ion secondary battery is allowed to stand at 25° C. for 2 h, to ensure that the temperature of the lithium-ion secondary battery is 25° C. The lithium-ion secondary battery is charged to a charging cut-off voltage of 3.65 V at 0.33 C and 25° C. Constant voltage charging continues to be performed at this charging cut-off voltage until current reaches 0.05 C. The charging ends (where C represents a rated capacity of the lithium-ion secondary battery). After the lithium-ion secondary battery was allowed to stand at 25° C. for 1 h, the lithium-ion secondary battery was discharged at 0.33 C to a discharging cut-off voltage 2.5 V at 25° C. The total discharging energy of the lithium-ion secondary battery was recorded as $E_0$.

The length, the width, and the height of the lithium-ion secondary battery are measured, and a volume value $V_0$=length*width*height of the lithium-ion secondary battery is calculated.

Volume energy density of the lithium-ion secondary battery=discharge energy $E_0$ of the lithium-ion secondary battery/volume $V_0$ of the lithium-ion secondary battery.

3. DCR Test Method

After being charged to 3.65 V at 25° C. by using a constant current of 0.33 C, the lithium-ion secondary battery is charged to a current of 0.05 C by using a constant voltage, and then is discharged to 20% SOC with ⅓ C; after being allowed to stand for 5 min, is discharged with a 3 C pulse for 30 s; after being allowed to stand for 40 s, charged with 3 C for 40 s; after being allowed to stand for 5 min, charged to 3.65 V at a constant current of ⅓ C, then charged to 0.05 C with a constant voltage, and then discharged to 10% SOC with ⅓ C; after being allowed to stand for 5 min, is discharged with a 3 C pulse for 30 s; after being allowed to stand for 40 s, charged with 3 C for 40 s; after being allowed to stand for 5 min, then charged fully with ⅓ C, and then discharged to 50% SOC with ⅓ C; then, after being allowed to stand for 2 h at −25° C., then discharged for 30 s with a pulse of 1 C, allowed to stand for 10 min, then allowed to stand at 25° C. for 2 h; after being charged to 3.65 V at a constant current of ⅓ C and then charged to 0.05 C at a constant voltage, is discharged to 20% SOC with ⅓ C; and then, after being allowed to stand at −25° C. for 2 h, is discharged for 30 s with a pulse of 1 C, and is allowed to stand for 10 min.

Voltages are recorded before and after each time of pulse discharge, and a DCR in different conditions is calculated. A calculation formula is DCR=(voltage before pulse discharge after the standing ends-voltage before the standing after pulse discharge)/impulse current.

Experimental Parameters and Test Results

In accordance with the above methods, the batteries of the examples and comparative examples were prepared, and tested for various performance parameters. The results are shown in Table 1 below.

battery while increasing the compacted density of the electrode plate, and also considering the dynamic performance of the battery.

It can be seen from comparison between Example 2, Example 4, and Comparison Example 1 that in a cross

TABLE 1

| | First group of ground products $D_{V50}$/μm | Second group of ground products $D_{V50}$/μm | First group of ground products: second group of ground products (mass ratio) | $D_{A50}$/nm | $D_{A10}$/nm | $D_{A90}$/nm | $(D_{A90}-D_{A10})/D_{A50}$ | Graphitization degree $C_{50}$ |
|---|---|---|---|---|---|---|---|---|
| Example 1 | 1.0 | 0.38 | 70:30 | 719 | 214 | 1674 | 2.031 | 1.04 |
| Example 2 | 0.8 | 0.30 | 70:30 | 656 | 122 | 1400 | 1.948 | 1.07 |
| Example 3 | 0.8 | 0.45 | 70:30 | 708 | 225 | 1556 | 1.880 | 1.02 |
| Example 4 | 0.8 | 0.45 | 60:40 | 688 | 210 | 1486 | 1.855 | 1.03 |
| Example 5 | 1.2 | 0.45 | 80:20 | 785 | 262 | 2100 | 2.341 | 1.04 |
| Example 6 | 1.2 | 0.30 | 70:30 | 757 | 186 | 1984 | 2.375 | 1.03 |
| Comparative Example 1 | 0.75 | 0.5 | 70:30 | 703 | 232 | 1387 | 1.643 | 1.03 |
| Comparative Example 2 | 1.5 | 0.38 | 70:30 | 798 | 283 | 2287 | 2.511 | 1.01 |
| Comparative Example 3 | / | / | / | 709 | 234 | 1939 | 2.405 | 1.00 |

| | Sphericity $L_{A50}$ | Compacted density of a fully discharged electrode plate g/cm³ | Direct current internal resistance DCR 25° C., 20% SOC/mΩ | 25° C., 10% SOC/mΩ | −25° C., 50% SOC/mΩ | −25° C., 20% SOC/mΩ | Energy density Wh/L |
|---|---|---|---|---|---|---|---|
| Example 1 | 0.725 | 2.59 | 43.6 | 63.9 | 390.1 | 471.3 | 450.0 |
| Example 2 | 0.751 | 2.55 | 41.3 | 60.4 | 369.8 | 450.6 | 443.4 |
| Example 3 | 0.737 | 2.53 | 42.5 | 62.1 | 380.1 | 460.5 | 440.0 |
| Example 4 | 0.726 | 2.52 | 39.5 | 57.7 | 354.3 | 435.2 | 436.7 |
| Example 5 | 0.709 | 2.54 | 46.6 | 68.4 | 415.1 | 498.2 | 441.7 |
| Example 6 | 0.719 | 2.61 | 44.8 | 66.1 | 404.1 | 489.2 | 453.3 |
| Comparative Example 1 | 0.735 | 2.47 | 40.9 | 59.9 | 365.1 | 439.3 | 430.1 |
| Comparative Example 2 | 0.698 | 2.60 | 48.4 | 74.3 | 440.0 | 528.8 | 4449 |
| Comparative Example 3 | 0.716 | 2.42 | 45.6 | 66.5 | 405.3 | 493.5 | 415.9 |

It can be seen from data comparison between the examples and the comparative examples that different from cognition in the existing technology, in the cross section of the positive electrode film layer along the electrode plate thickness direction, an excessively high particle size concentration ratio has a limited effect on improving compaction of the electrode plate, and it is difficult to further improve compaction of the electrode plate by adjusting the particle size concentration ratio. When $D_{A90}$ of the particles is controlled to range from 1400 nm to 2100 nm, and a particle size concentration ratio $(D_{A90}-D_{A10})/D_{A50}$ is controlled to range from 1.855 to 2.375 in a cross section of the positive electrode film layer in an electrode plate thickness direction, the battery has a relatively high compacted density and an energy density of the positive electrode plate, so that the battery has good dynamic performance.

It may be learned from comparison between Example 5 and other examples that $D_{A90}$ of the particles ranging from 1400 nm to 2000 nm can further reduce direct current internal resistance of the battery.

It may be learned from comparison between Examples 5 and 6 and other examples that $D_{A50}$ of the particles in the cross section of the positive electrode film layer in the electrode plate thickness direction ranging from 650 nm to 750 nm is beneficial to further reducing the impedance of the section of the positive electrode film layer in an electrode plate thickness direction, a particle size concentration ratio $(D_{A90}-D_{A10})/D_{A50}$ ranges from 1.855 to 2.375, so that the particles in the positive electrode film layer have a relatively good grading, thereby improving a particle packing situation, and increasing a compacted density of the electrode plate and an energy density of the battery.

It should be noted that the present disclosure is not limited to the above embodiments. The above described examples are merely exemplary, and examples having substantially the same technical idea and the same effects within the scope of the technical solution of the present application are all included in the technical scope of the present application. In addition, other examples constructed by applying various modifications conceivable to those skilled in the art to the examples and combining some of the constituent elements of the examples without departing from the scope of the essence of the present application are also included in the scope of the present application.

What is claimed is:

1. A lithium-ion secondary battery, comprising a positive electrode plate, a negative electrode plate, and an electrolyte, wherein the positive electrode plate comprises a positive electrode current collector and a positive electrode film layer arranged on at least one side of the positive electrode current collector;

the positive electrode film layer comprises a positive electrode active material, and the positive electrode active material comprises lithium-containing transition metal phosphate particles, at least some surfaces of which are provided with a carbon coated material; and in a cross section of the positive electrode film layer in an electrode plate thickness direction, $D_{A90}$ of the particles ranges from 1400 nm to 2100 nm, and a particle size concentration ratio $(D_{A90}-D_{A10})/D_{A50}$ ranges from 1.855 to 2.375, wherein $D_{A90}$, $D_{A50}$, and $D_{A10}$ refer to corresponding particle sizes of particles when area cumulative distributions of the particles reach 90%, 50%, and 10% in an area cumulative distribution curve of the particles.

2. The lithium-ion secondary battery according to claim 1, wherein $D_{A90}$ of the particles in the cross section of the positive electrode film layer in the electrode plate thickness direction ranges from 1400 nm to 2000 nm.

3. The lithium-ion secondary battery according to claim 1, wherein $D_{A50}$ of the particles in the cross section of the positive electrode film layer in the electrode plate thickness direction ranges from 600 nm to 900 nm.

4. The lithium-ion secondary battery according to claim 1, wherein $D_{A10}$ of the particles in the cross section of the positive electrode film layer in the electrode plate thickness direction ranges from 100 nm to 300 nm.

5. The lithium-ion secondary battery according to claim 1, wherein in a graphitization degree C value cumulative distribution curve of the positive electrode film layer that is obtained in a laser micro-confocal Raman spectrometer surface scanning mode, a graphitization degree median C50 ranges from 0.98 to 1.20; and a graphitization degree C value is IG/ID, wherein IG represents an intensity of a G peak at 1580±100 $cm^{-1}$ of a Raman spectrum, and $I_D$ represents an intensity of a D peak at 1350±100 $cm^{-1}$ of the Raman spectrum.

6. The lithium-ion secondary battery according to claim 1, wherein in the sphericity area cumulative distribution curve of the particles that are obtained from the cross section of the positive electrode film layer in the electrode plate thickness direction, the sphericity median $L_{A50}$ ranges from 0.70 to 0.85.

7. The lithium-ion secondary battery according to claim 1, wherein in a roughness area cumulative distribution curve of the particles that are obtained from the cross section of the positive electrode film layer in the electrode plate thickness direction, a roughness median $R_{A50}$ ranges from 0.92 to 0.96; and/or in the roughness area cumulative distribution curve of the particles that are obtained from the cross section of the positive electrode film layer in the electrode plate thickness direction, a roughness concentration ratio $(R_{A90}-R_{A10})/R_{A50}$ ranges from 0.05 to 0.10.

8. The lithium-ion secondary battery according to claim 1, wherein an iron dissolution rate of the positive electrode film layer ranges from 400 ppm to 1800 ppm;

a mass content of a carbon element based on a total mass of the positive electrode active material ranges from 0.8% to 1.8%; and/or a lithium-iron antisite defect concentration of the positive electrode active material ranges from 0.001% to 1.5%.

9. The lithium-ion secondary battery according to claim 1, wherein the lithium-containing transition metal phosphate comprises a component having the following general formula:

$$Li_mFe_xP_yO_jQ_q$$

wherein Q comprises one or more of Al, Na, K, Mg, Cu, Mn, Cr, Zn, Pb, Ca, Co, Ni, Sr, Nb, V, Ti, B, S, Si, N, F, Cl, and Br, $0.8 \leq m \leq 1.15$, $0.9 \leq x \leq 1$, $0.95 \leq y \leq 1$, $3.5 \leq j \leq 4$, and $0 < q \leq 0.1$.

10. The lithium-ion secondary battery according to claim 1, wherein the positive electrode active material comprises one or more of lithium iron phosphate, a doped and modified material thereof, and a coated and modified material thereof.

11. The lithium-ion secondary battery according to claim 1, wherein the positive electrode active material comprises a titanium element, and a mass content of the titanium element based on the total mass of the positive electrode active material ranges from 4000 ppm to 8000 ppm;

a powder tapped density of the positive electrode active material ranges from 1.00 $g/cm^3$ to 1.70 $g/cm^3$; and/or a powder resistivity of the positive electrode active material under a pressure of 8 MPa ranges from 0.5 Ω·cm to 60.0 Ω·cm.

12. The lithium-ion secondary battery according to claim 1, wherein a discharge gram capacity of the positive electrode active material at a discharge rate of 1 C ranges from 135 mAh/g to 150 mAh/g.

13. The lithium-ion secondary battery according to claim 1, wherein a ratio of a discharge capacity of the positive electrode active material discharged to 3.2 V is $\eta \geq 85\%$, wherein η is defined as follows: a button battery comprising the positive electrode active material is charged and discharged twice at a constant current with a rate of 0.1 C in a voltage range of 2.0 V to 3.75 V at a room temperature, and then is charged and discharged once at a constant current with a rate of 1 C; and in a charge and discharge test at the rate of 1 C, a capacity value at which a discharge voltage is 3.2 V is extracted and recorded as $C_1$, a capacity value at which a discharge voltage is 2.0 V is extracted and recorded as $C_2$, and $\eta = C_1/C_2$, wherein a charge process comprises constant-voltage charge with a constant voltage of 3.75 V and a constant-voltage cut-off current of 50 μA.

14. The lithium-ion secondary battery according to claim 1, wherein a mass content of a conductive agent based on a total mass of the positive electrode film layer ranges from 0.01% to 1.5%; and/or the positive electrode film layer further comprises a binder, and based on the total mass of the positive electrode film layer, a mass content of the positive electrode active material ranges from 94.0% to 99.4%.

15. The lithium-ion secondary battery according to claim 1, wherein a single-sided surface density of the positive electrode film layer ranges from 300 mg/1540 $mm^2$ to 450 mg/1540 $mm^2$;

in a fully discharged state of the lithium-ion secondary battery, a compacted density of the positive electrode film layer ranges from 2.52 $g/cm^3$ to 2.78 $g/cm^3$.

16. The lithium-ion secondary battery according to claim 1, wherein the positive electrode film layer satisfies at least one of the following:

(1) in a fully discharged state of the lithium-ion secondary battery, the compacted density of the positive electrode film layer ranges from 2.52 $g/cm^3$ to 2.78 $g/cm^3$, and in the cross section of the positive electrode film layer in the electrode plate thickness direction, a porosity of the positive electrode film layer ranges from 10% to 22%; and (2) in a fully discharged state of the lithium-ion secondary battery, the compacted density of the positive electrode film layer ranges from 2.55 g/cm$^3$ to 2.75 g/cm$^3$, and in the cross section of the positive electrode film layer in the electrode plate thickness direction, a porosity of the positive electrode film layer ranges from 10% to 20%.

17. The lithium-ion secondary battery according to claim 1, wherein the positive electrode plate comprises an undercoating, and the undercoating is arranged between the positive electrode film layer and the current collector; and the undercoating satisfies at least one of the following:

(1) the undercoating comprises carbon-based particles, and a distribution density of the carbon-based particles having particle sizes greater than 100 nm in the undercoating is ≤10 pcs/10 μm;

(2) a compacted density of the positive electrode plate in the fully discharged state is greater than or equal to 2.4 g/cm$^3$, and a single-sided thickness of the undercoating ranges from 1 m to 4 μm; and (3) a compacted density of the positive electrode plate in the fully discharged state is greater than or equal to 2.5 g/cm$^3$, and a single-sided thickness of the undercoating ranges from 2 μm to 4 μm.

18. A battery apparatus, comprising the lithium-ion secondary battery according to claim 1, wherein the battery apparatus comprises at least one of a battery module, a battery pack, and an energy storage battery.

19. A preparation method for a positive electrode plate, wherein the preparation method comprising:

providing a positive electrode active material comprising lithium-containing transition metal phosphate particles, at least some surfaces of which are provided with a carbon coated material, wherein the positive electrode active material comprises a mixture of a first group of ground particles and a second group of ground particles, a volume median particle size $D_{V50}$ of the first group of ground particles is 0.8 μm to 1.2 μm, a volume median particle size $D_{V50}$ of the second group of ground particles is 0.30 μm to 0.5 μm, and a mass ratio of the first group of ground particles to the second group of ground particles is 60:40 to 80:20;

sequentially adding a binder, a conductive agent, and the positive electrode active material, dry mixing, adding a solvent, stirring, and adjusting a viscosity, to obtain a delivery slurry;

transfer-coating at least one side of a current collector with the delivery slurry, drying, and hot pressing, to obtain a positive electrode film layer;

wherein the drying is at a temperature ranging from 95° C. to 105° C. and a speed ranging from 2.0 m/min to 2.3 m/min, wherein the hot pressing comprises at least three times of hot rolling with hot rolling pressures sequentially increased and sequentially ranging from 20 metric tons to 50 metric tons, 50 metric tons to 70 metric tons, and 70 metric tons to 90 metric tons, a hot rolling temperature ranges from 40° C. to 80° C., and before entering hot rolling for a first time, the electrode plate is heated at 40° C. to 50° C., wherein in a cross section of the positive electrode film layer in an electrode plate thickness direction, $D_{A90}$ of particles ranges from 1400 nm to 2100 nm and $(D_{A90}-D_{A10})/D_{A50}$ ranges from 1.855 to 2.375.

20. A lithium-ion secondary battery, comprising a positive electrode plate, a negative electrode plate, and an electrolyte, wherein the positive electrode plate comprises a positive electrode current collector and a positive electrode film layer arranged on at least one side of the positive electrode current collector, the negative electrode plate comprises a negative electrode current collector and a negative electrode film layer arranged on at least one side of the negative electrode current collector;

the positive electrode film layer comprises a positive electrode active material, and the positive electrode active material comprises lithium-containing transition metal phosphate particles and a titanium element, at least some surfaces of which are provided with a carbon coated material, and a mass content of the titanium element based on the total mass of the positive electrode active material ranges from 4000 ppm to 8000 ppm; and the negative electrode film layer comprises a negative electrode active material, the negative electrode active material comprises artificial graphite;

wherein the positive electrode active material comprises a mixture of a first group of ground particles and a second group of ground particles, a volume median particle size $D_{V50}$ of the first group of ground particles is 0.8 μm to 1.2 μm, a volume median particle size $D_{V50}$ of the second group of ground particles is 0.30 μm to 0.45 μm, and a mass ratio of the first group of ground particles to the second group of ground particles is 60:40 to 80:20, wherein in a cross section of the positive electrode film layer in an electrode plate thickness direction, $D_{A90}$ of the particles ranges from 1400 nm to 2100 nm, $D_{A50}$ of the particles in the cross section of the positive electrode film layer in the electrode plate thickness direction ranges from 708 nm to 785 nm, $D_{A10}$ of the particles in the cross section of the positive electrode film layer in the electrode plate thickness direction ranges from 122 nm to 262 nm, and a particle size concentration ratio $(D_{A90}-D_{A10})/D_{A50}$ ranges from 1.855 to 2.375, wherein $D_{A90}$, $D_{A50}$, and $D_{A10}$ refer to corresponding particle sizes of particles when area cumulative distributions of the particles reach 90%, 50%, and 10% in an area cumulative distribution curve of the particles, wherein a graphitization degree C value cumulative distribution curve of the positive electrode film layer that is obtained in a laser micro-confocal Raman spectrometer surface scanning mode, a graphitization degree median $C_{50}$ ranges from 1.02 to 1.07; and a graphitization degree C value is IG/ID, wherein IG represents an intensity of a G peak at 1580±100 cm$^{-1}$ of a Raman spectrum, and $I_D$ represents an intensity of a D peak at 1350±100 cm$^{-1}$ of the Raman spectrum, wherein in the sphericity area cumulative distribution curve of the particles that are obtained from the cross section of the positive electrode film layer in the electrode plate thickness direction, the sphericity median $L_{A50}$ ranges from 0.709 to 0.751.

* * * * *